(12) United States Patent
Ahuja et al.

(10) Patent No.: US 9,379,810 B2
(45) Date of Patent: Jun. 28, 2016

(54) RAPID RECOVERY IN PACKET AND OPTICAL NETWORKS

(71) Applicants: Satyajeet Singh Ahuja, Cupertino, CA (US); Ping Pan, San Jose, CA (US); Rajan Rao, Fremont, CA (US); Biao Lu, Cupertino, CA (US)

(72) Inventors: Satyajeet Singh Ahuja, Cupertino, CA (US); Ping Pan, San Jose, CA (US); Rajan Rao, Fremont, CA (US); Biao Lu, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 376 days.

(21) Appl. No.: 13/867,330

(22) Filed: Apr. 22, 2013

(65) Prior Publication Data

US 2014/0147106 A1    May 29, 2014

Related U.S. Application Data

(60) Provisional application No. 61/806,477, filed on Mar. 29, 2013, provisional application No. 61/730,155, filed on Nov. 27, 2012.

(51) Int. Cl.
*H04B 10/00* (2013.01)
*H04B 10/032* (2013.01)
*H04J 14/00* (2006.01)

(52) U.S. Cl.
CPC .................................. *H04B 10/032* (2013.01)

(58) Field of Classification Search
CPC .... H04B 10/03; H04B 10/032; H04B 10/038; H04B 10/0268; H04B 10/0287; H04B 10/0291; H04B 10/0295

USPC .......................................................... 398/2, 5
See application file for complete search history.

(56) References Cited

U.S. PATENT DOCUMENTS

| | | | |
|---|---|---|---|
| 6,795,394 B1 * | 9/2004 | Swinkels | H04J 3/085 370/221 |
| 2003/0065811 A1 * | 4/2003 | Lin | H04L 12/5695 709/232 |
| 2003/0147352 A1 * | 8/2003 | Ishibashi et al. | 370/248 |
| 2003/0223359 A1 * | 12/2003 | Einstein | H04L 45/22 370/228 |
| 2004/0202467 A1 * | 10/2004 | Luft et al. | 398/4 |
| 2005/0122899 A1 * | 6/2005 | DeBoer | H04J 3/085 370/222 |
| 2006/0188251 A1 * | 8/2006 | Chan | H04J 14/0283 398/4 |

* cited by examiner

*Primary Examiner* — Daniel Dobson
(74) *Attorney, Agent, or Firm* — Harrity & Harrity LLP; David L. Soltz

(57) ABSTRACT

A node may determine a failure in a first path for routing first optical network traffic between a first set of networking devices, where the first path includes a first set of optical transport nodes. The node may determine a second path for routing the first optical network traffic between the first set of networking devices, where the second path includes a second set of optical transport nodes that route second optical network traffic between a second set of networking devices. The second set of optical transport nodes may include at least one node that is not included in the first set of optical transport nodes. The node may pre-empt routing of the second optical network traffic via the second path, and may route the first optical network traffic via the second path after pre-empting routing of the second optical network traffic via the second path.

31 Claims, 23 Drawing Sheets

| Main Path 510 | Label 520 | Backup Path 530 | Switchover Condition 540 | Pre-emption Mode 550 | Switchback Condition 560 |
|---|---|---|---|---|---|
| A-B-C-D | LSP1 | A-E-F-G-D | More than 100 packets per millisecond | Drop | Fewer than 100 packets per millisecond |
| A-B-C-D | LSP2 | A-E-F-G-D | Notification from routing device | De-prioritize | Notification from routing device |
| A-B-C-D | LSP3 | A-E-F-G-D | Notification from routing device | Re-route H-J-K-I | Notification from routing device |
| A-B-C-D | LSP4 | --- | Notification from routing device | Drop LSP4 | Notification from routing device |
| A-B-C-D | LSP5 | E-F-G-H | OAM message | Default pre-emption | OAM message |

RAPID RECOVERY IN PACKET AND OPTICAL NETWORKS

RELATED APPLICATIONS

This application claims priority under 35 U.S.C. §119 to U.S. Provisional Patent Application No. 61/730,155, filed on Nov. 27, 2012, the content of which is incorporated by reference herein in its entirety. This application also claims priority under 35 U.S.C. §119 to U.S. Provisional Patent Application No. 61/806,477, filed on Mar. 29, 2013, the content of which is incorporated by reference herein in its entirety.

BACKGROUND

An optical transport network may include a set of optical transport nodes connected by optical fiber links. An optical transport node may include one or more optical cross-connects used to switch high-speed optical signals across different optical fibers and/or different channels on an optical fiber. An optical transport network may experience a failure, such as a failure in an optical transport node (e.g., a malfunctioning node) or a failure in an optical fiber link (e.g., a cut in a fiber). When an optical transport network experience such a failure, network traffic may be routed via another path in the network (e.g., using other nodes and links).

SUMMARY

According to some example implementations, a system may include one or more nodes configured to determine a failure in a first path for routing first optical network traffic between a first set of networking devices, where the first path includes a first set of optical transport nodes. The one or more nodes may be configured to determine, based on determining the failure, a second path for routing the first optical network traffic between the first set of networking devices, where the second path includes a second set of optical transport nodes that route second optical network traffic between a second set of networking devices. The second set of optical transport nodes may include at least one node that is not included in the first set of optical transport nodes. The one or more nodes may be configured to pre-empt routing of the second optical network traffic via the second path based on determining the second path, and may be configured to route the first optical network traffic via the second path after pre-empting routing of the second optical network traffic via the second path.

According to some example implementations, a system may include one or more nodes configured to determine a failure in a first path for routing first optical network traffic between a first set of networking devices, where the first path includes a first set of optical transport nodes. The one or more nodes may be configured to determine, based on determining the failure, a second path for routing the first optical network traffic between the first set of networking devices, where the second path includes a second set of optical transport nodes that route second optical network traffic between a second set of networking devices. The second set of optical transport nodes may include at least one node that is not included in the first set of optical transport nodes. The one or more nodes may be configured to provision the second path by dropping, re-routing, or de-prioritizing the second optical network traffic via the second path based on determining the second path, and may be configured to route the first optical network traffic via the second path based on provisioning the second path.

According to some example implementations, a method may include detecting, by a network node, a failure in a first path for routing first optical network traffic between a first set of networking devices, where the first path includes a first set of optical transport nodes and a first set of links between the first set of optical transport nodes. The method may include determining, by a network node and based on detecting the failure, a second path for routing the first optical network traffic between the first set of networking devices, where the second path includes a second set of optical transport nodes and a second set of links between the second set of optical transport nodes. The second set of optical transport nodes and the second set of links may route second optical network traffic between a second set of networking devices prior to detection of the failure. The method may include pre-empting, by a network node, routing of the second optical network traffic via the second path based on determining the second path. The method may include routing, by a network node, the first optical network traffic via the second path based on determining the second path.

BRIEF DESCRIPTION OF THE DRAWINGS

FIG. 5 is a diagram of an example data structure for storing information associated with a backup path.

DETAILED DESCRIPTION

The following detailed description of example implementations refers to the accompanying drawings. The same reference numbers in different drawings may identify the same or similar elements.

In a network, such as a packet network or an optical network, information may be routed from a transmitting device to a receiving device via a main path (e.g., a working path) that includes network nodes and links between the nodes. If there is a failure in one of the nodes or one of the links on the main path, the information may be re-routed using a different path, such as a backup path (e.g., a protection path) that includes backup nodes and links between the backup nodes. The backup path may include dedicated bandwidth, on the nodes and links, that is only utilized when a failure occurs on the main path. However, this setup wastes bandwidth that could be utilized for network traffic when a failure has not occurred on the main path. Implementations described herein may improve bandwidth usage by permitting routing of network traffic via a backup path, and pre-empting that traffic when a failure occurs in the main path.

Figure 1A:
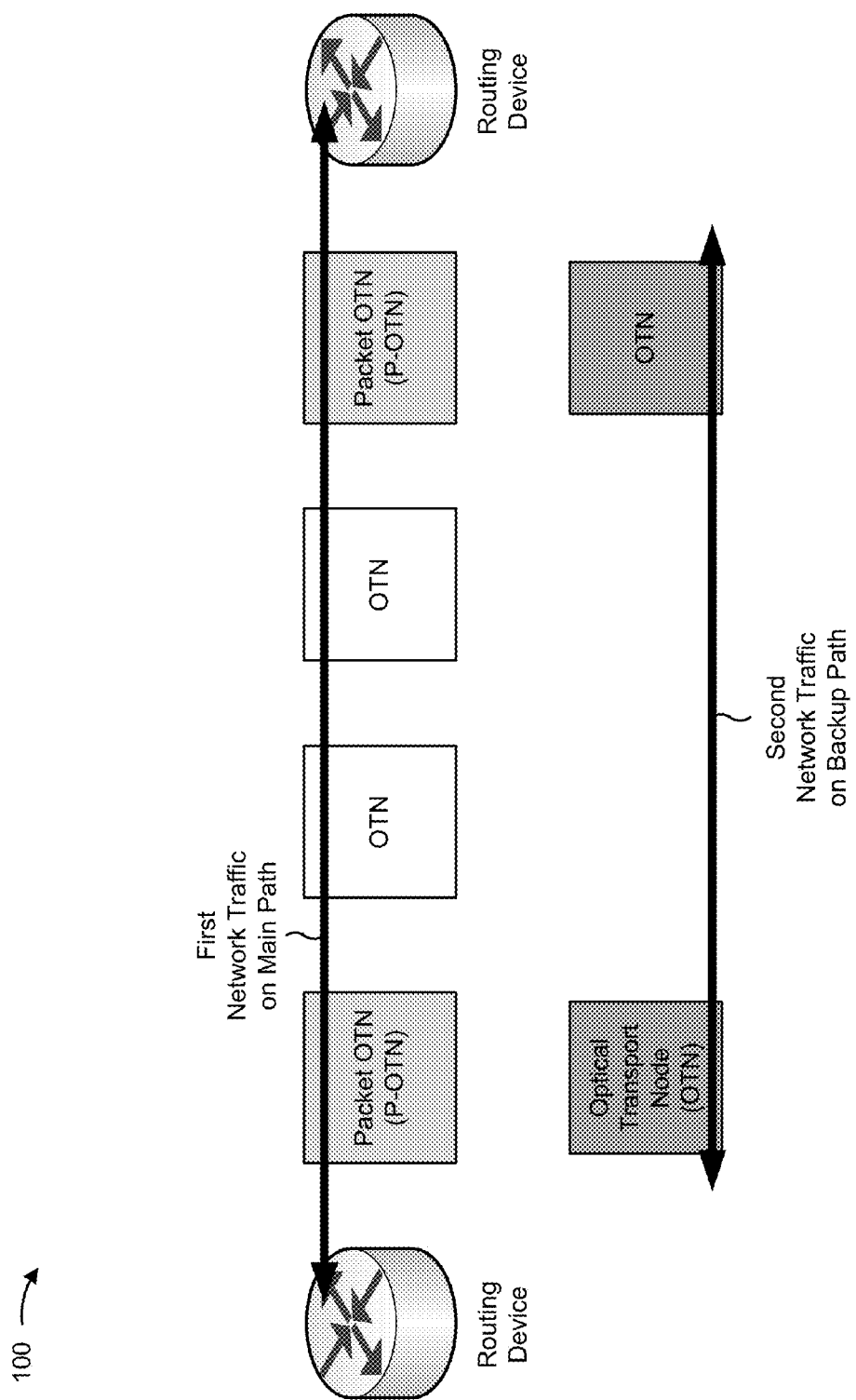
FIGS. 1A-1C are diagrams of an overview of an example implementation described herein.
Figure 1B:
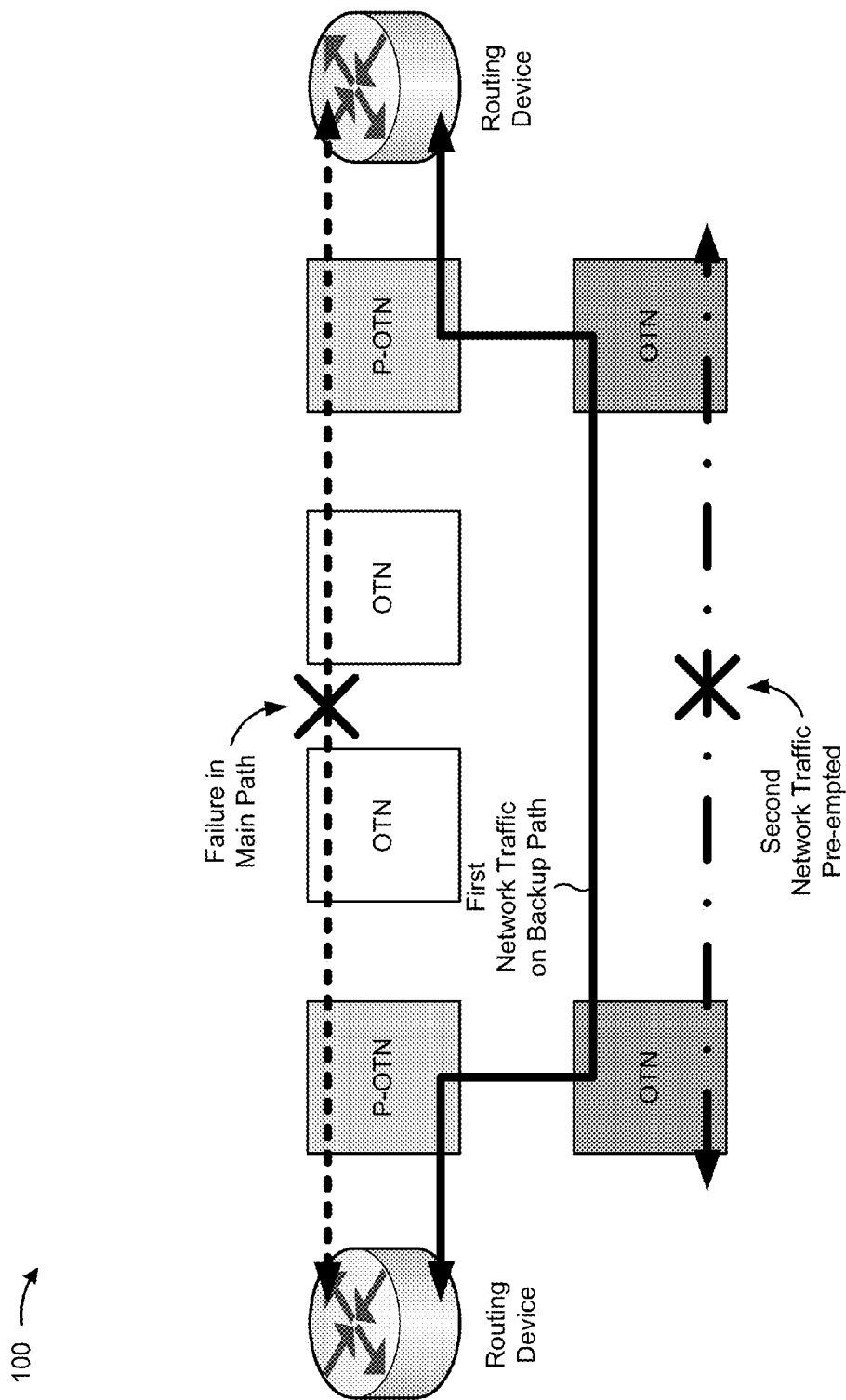
Figure 1C:
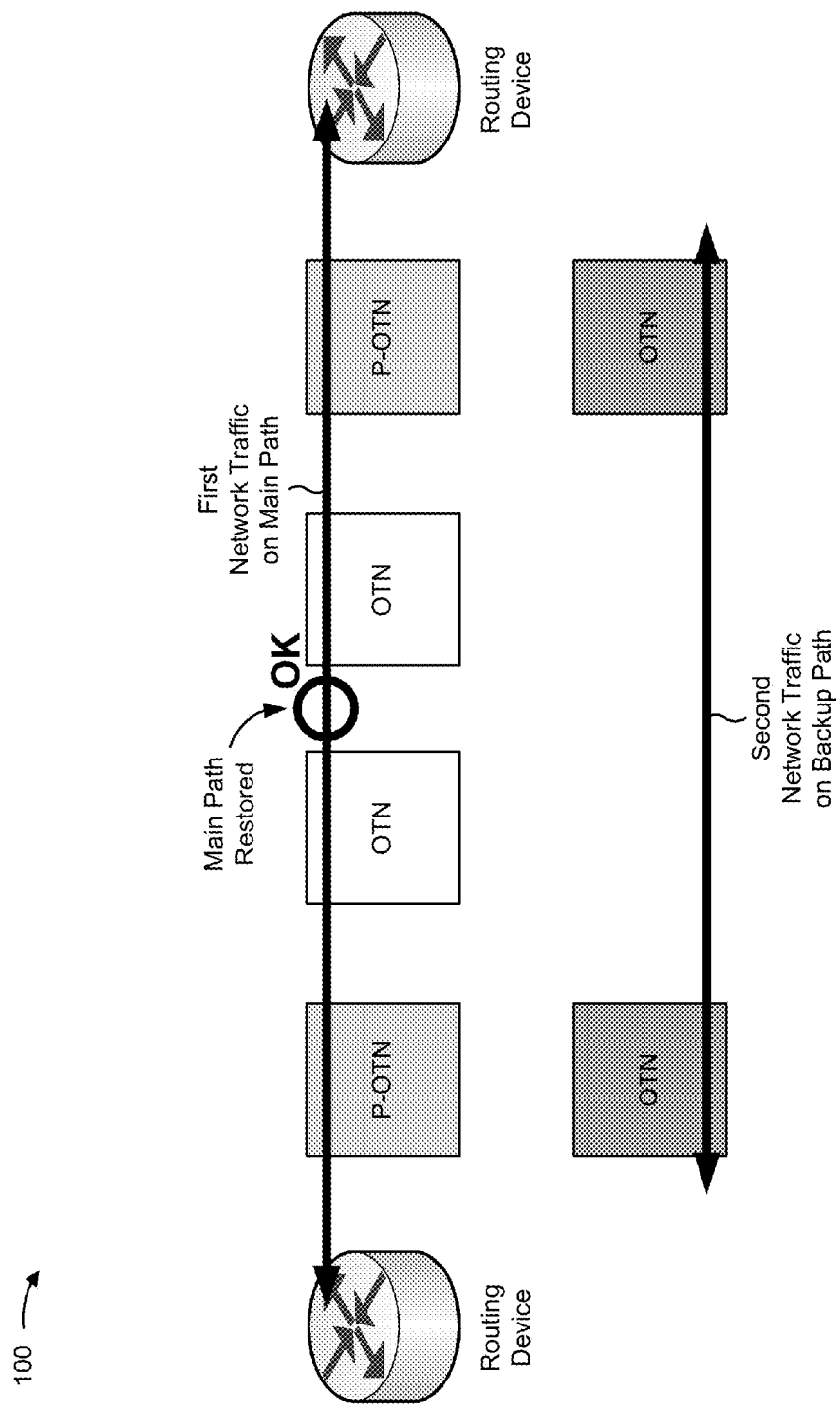

FIGS. 1A-1C are diagrams of an overview of an example implementation 100 described herein. Assume, as shown in FIG. 1A, that a network includes multiple routing devices, such as multiple routers. First network traffic may be routed, between the routing devices, via a main path. The main path may include multiple packet optical transport nodes (P-OTNs) for routing the first network traffic, and multiple optical transport nodes (OTNs) for routing the first network traffic. In some implementations, a P-OTN may include an optical transport node with packet processing capabilities, while an OTN may include an optical transport node without packet processing capabilities. Assume further that the network includes a backup path that includes other OTNs for routing second network traffic via the backup path. The second network traffic may be routed, for example, between other routing devices, via the backup path.

As shown in FIG. 1B, the main path may experience a failure, such as a fiber cut, a malfunctioning link, and/or a malfunctioning node. A P-OTN, on the main path, may detect the failure, and may re-route the first network traffic via the backup path. For example, a P-OTN may provision (e.g., reserve) bandwidth on the backup path that was previously provisioned for the second network traffic, thus pre-empting the second network traffic. A P-OTN or an OTN on the backup path may pre-empt the second network traffic by, for example, dropping the second network traffic, re-routing the second network traffic on another path, and/or de-prioritizing the second network traffic.

As shown in FIG. 1C, the main path may be restored when the failure is resolved. For example, a fiber and/or a node may be repaired. A P-OTN may detect that the main path has been restored, and may re-provision bandwidth on the main path for routing the first network traffic. Furthermore, the P-OTN may re-provision bandwidth on the backup path for routing the second network traffic. In this way, the P-OTN may improve bandwidth utilization by permitting routing of the second network traffic via the backup path, and pre-empting the second network traffic in favor of the first network traffic when a failure occurs in the main path.

Figure 2:
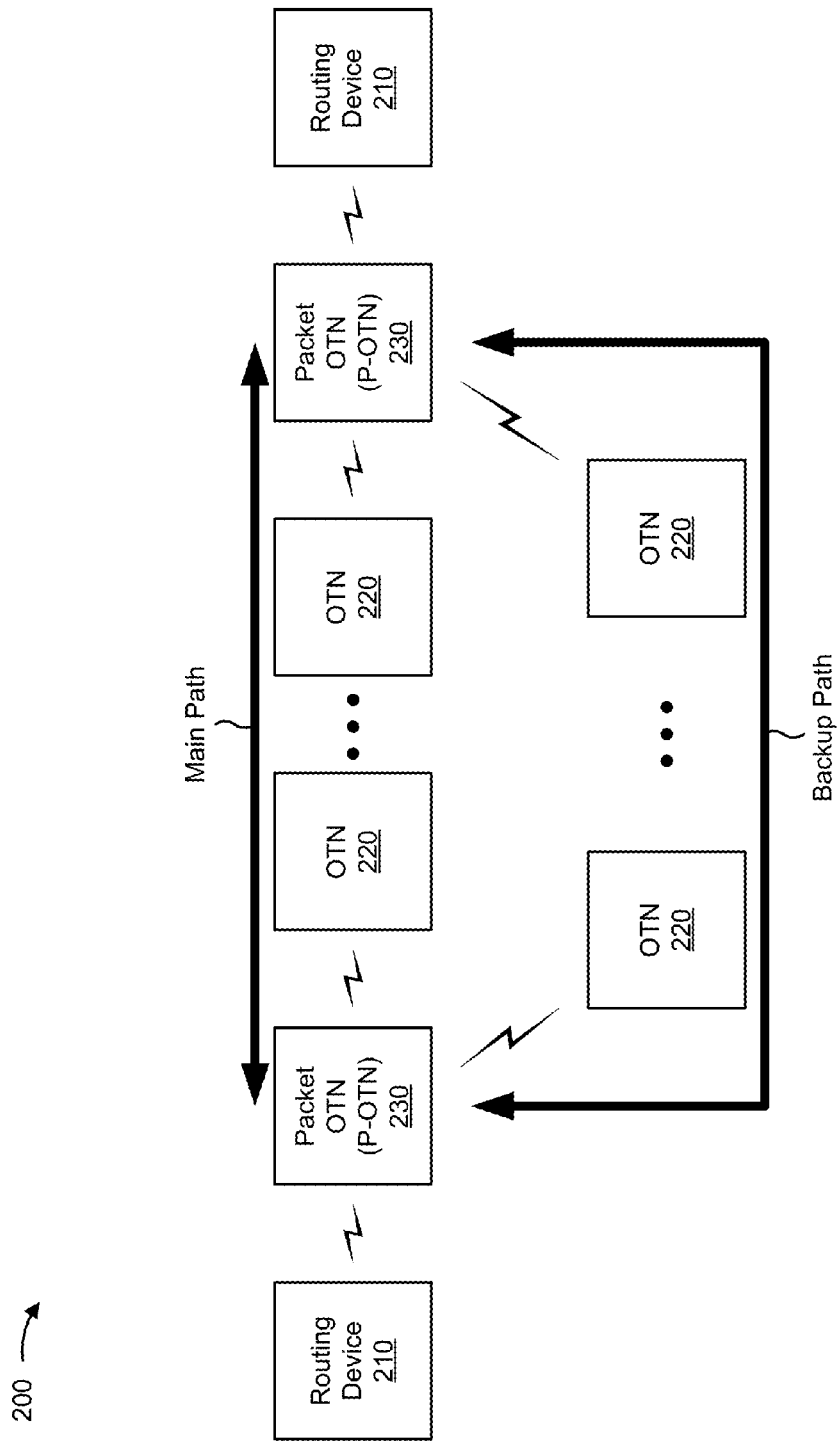
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more routing devices 210, one or more optical transport nodes (OTNs) 220 (e.g., one or more OTNs 220 on a main path and one or more OTNs 220 on a backup path), and/or one or more packet OTNs (P-OTN) 230. Network traffic may be routed via a main path that includes a first set of OTNs 220 and/or one or more P-OTNs 230. Network traffic may also be routed via a backup path that includes a second set of OTNs 220 and/or one or more P-OTNs 230.

Routing device 210 may include a network device that transmits and/or receives data signals. For example, routing device 210 may include a router, a switch, a gateway, a hub, a central office, or another type of traffic transfer device. Routing device 210 may include various components, such as input and output components and a controller to direct the transmission of a data signal and/or network traffic from an input component to an output component.

OTN 220 may include a transport device, such as a digital switching device (e.g., an OTN switch), a Dense Wavelength Division Multiplexing (DWDM) device, or a device that is a combination of a digital switching device and a DWDM device. For example, OTN 220 may perform digital or optical multiplexing operations (e.g., receive individual data signals on individual channels and generate a multiplexed signal, such as a multiplexed digital signal or a multi-wavelength optical signal, that may be transmitted on a single channel), amplification operations (e.g., amplify the multiplexed signal), add-drop multiplexing operations (e.g., remove one or more data signals from the multiplexed signal), and/or demultiplexing operations (e.g., receive the multiplexed signal and separate the multiplexed signal back into individual data signals that may be transmitted on individual channels). To perform these operations, OTN 220 may contain various components, such as a multiplexer (to perform the multiplexing operations), an amplifier (to perform the amplification operations), an add-drop multiplexer (e.g., a remotely configurable add/drop multiplexer (ROADM)) (to perform the add-drop multiplexing operations), and/or a demultiplexer (to perform the demultiplexing operations).

P-OTN 230 may include a routing device 210 and/or an OTN 220, and/or may include a device capable of performing one or more functions of routing device 210 and/or OTN 220. For example, P-OTN 230 may include a routing element that performs one or more functions of routing device 210 and a transport element that performs one or more functions of OTN 220.

As shown in FIG. 2, environment 200 may include a main path and a backup path. One or more nodes may route network traffic via the main path. For example, the main path may include one or more OTNs 220 and/or one or more P-OTNs 230, and links between the OTNs 220 and/or the P-OTNs 230. Additionally, or alternatively, one or more nodes may route traffic via a backup path. For example, the backup path may include one or more OTNs 220 and/or one or more P-OTNs 230, and links between the OTNs 220 and/or the P-OTNs 230. A node, as used herein, may generally refer to routing device 210, OTN 220, and/or P-OTN 230.

The number of devices shown in FIG. 2 is provided as an example. In practice, there may be additional devices, fewer devices, different devices, or differently arranged devices than those shown in FIG. 2. For example, routing device 210 may be connected to multiple P-OTNs 230, such as a first P-OTN 230 along the main path, and a second P-OTN 230 along the backup path. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, direct connections, indirect connections, or a combination of wired, wireless, direct, and/or indirect connections.

Figure 3A:
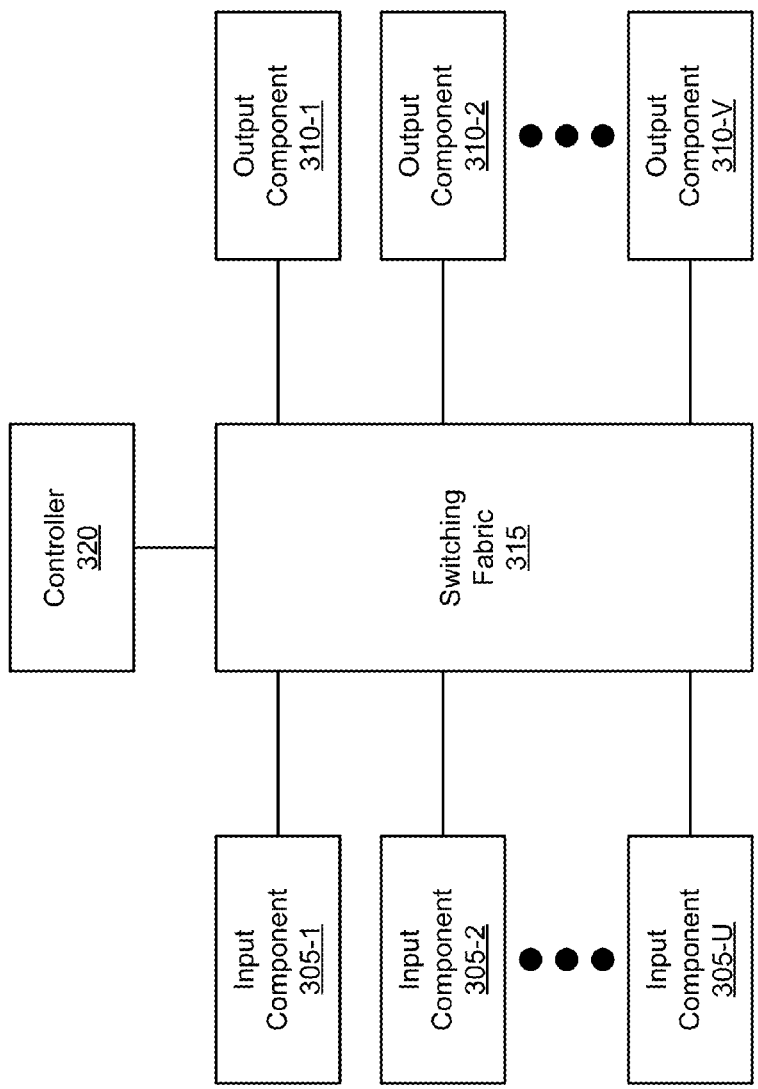
FIGS. 3A-3C are diagrams of example components of one or more devices of FIG. 2.
Figure 3B:
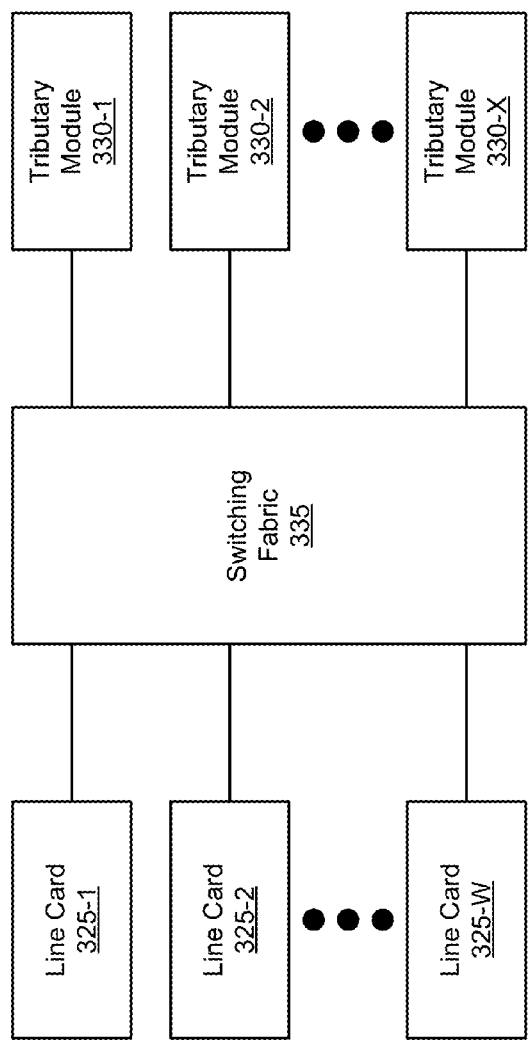
Figure 3C:
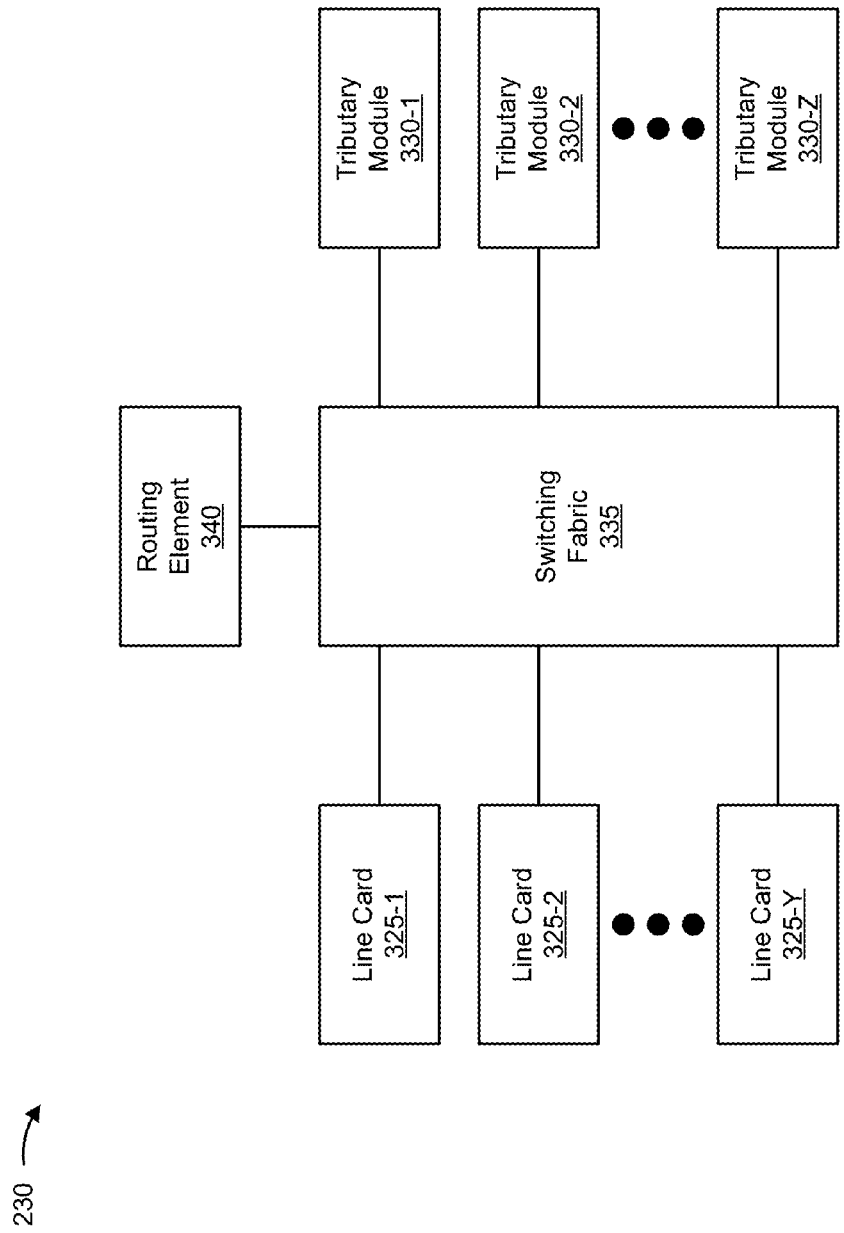

FIGS. 3A-3C are diagrams of example components of one or more devices of FIG. 2. FIG. 3A is a diagram of example components of routing device 210. FIG. 3B is a diagram of example components of OTN 220. FIG. 3C is a diagram of example components of P-OTN 230.

As shown in FIG. 3A, routing device 210 may include input components 305-1, 305-2, . . . , 305-U (U≥1) (referred to collectively as "input components 305" and individually as "input component 305"), output components 310-1, 310-2, . . . , 310-V (V≥1) (referred to collectively as "output components 310" and individually as "output component 310"), switching fabric 315, and controller 320.

Input component 305 may include a component or a collection of components to process incoming data (e.g., data received on network links). Input component 305 may manage a port or a collection of ports via which the data can be received. Input component 305 may perform certain operations on incoming data, such as decapsulation, encapsulation, demultiplexing, multiplexing, queuing, etc. operations, that may facilitate the processing and/or transporting of the incoming data by other components of routing device 210.

Output component 310 may include a component or a collection of components to process outgoing data (e.g., data transmitted on network links). Output component 310 may manage a port or a collection of ports via which data can be transmitted. Output component 310 may perform certain operations on outgoing data, such as encapsulation, decapsulation, multiplexing, demultiplexing, queuing, prioritizing, etc. operations, that may facilitate the processing and/or transmission of the outgoing data from routing device 210.

Switching fabric 315 may include one or more switching planes to facilitate communication among input components 305, output components 310, and/or controller 320. In some implementations, each of the switching planes may include a single or multi-stage switch of crossbar elements. Switching fabric 315 may also, or alternatively, include processors, memories, and/or paths that permit communication among input components 305, output components 310, and/or controller 320.

Controller 320 may include one or more processors, microprocessors, application specific integrated circuits (ASICs), field programmable gate arrays (FPGAs), or the like, that are optimized for networking and communications. Controller 320 may also include static memory (e.g., a read only memory (ROM)), dynamic memory (e.g., a random access memory (RAM)), cache memory, and/or flash memory for storing data and/or machine-readable instructions.

Controller 320 may also communicate with other routing devices 210 to exchange information regarding network topology and labels to facilitate the label switching of data. Controller 320 may perform multiprotocol label switching (MPLS) functions for routing device 210, such as label lookups, label popping, swapping, and/or pushing operations, routing decisions, etc. Controller 320 may also assist in establishing diverse paths across domains.

As shown in FIG. 3B, OTN 220 may include line cards 325-1, 325-2, . . . , 325-W (W≥1) (referred to collectively as "line cards 325" and individually as "line card 325"), tributary modules 330-1, 330-2, . . . , 330-X (X≥1) (referred to collectively as "tributary modules 330" and individually as "tributary module 330"), and switching fabric 335.

Line card 325 may include hardware components, or a combination of hardware and software components, that connect to a link and provide signal processing services. Line card 325 may include a receiver and/or a transmitter. The receiver may receive a digital (or optical) signal from a link, and perform various processing on the signal, such as decoding, decapsulation, etc. The transmitter may perform various processing on a signal, such as encoding, encapsulation, etc., and transmit the signal on a link.

Tributary module 330 may include hardware components, or a combination of hardware and software components, that terminate client signals. For example, tributary module 330 may support flexible adding-dropping of multiple services, such as OTN services, Synchronous Optical Networking/Synchronous Digital Hierarchy (SONET/SDH) services, Gigabit Ethernet (GbE) services, and Fibre Channel (FC) services. In some implementations, tributary module 330 may encapsulate client signals in a data frame. The data frame may permit all types of services to be transparent and robustly managed.

Switching fabric 335 may include a switching architecture that permits cross-connects to be established between line cards 325, between tributary modules 330, and/or between line cards 325 and tributary modules 330.

As shown in FIG. 3C, P-OTN 230 may include one or more line cards 325, one or more tributary modules 330, and switching fabric 335, which are described above in connection with FIG. 3B. Additionally, P-OTN 230 may include a routing element 340. Routing element 340 may correspond to routing device 210 and/or one or more components of routing device 210, such as input component 305, output component 310, switching fabric 315, and/or controller 320, which are described above in connection with FIG. 3A.

The number of components shown in FIGS. 3A-3C is provided as an example. In practice, routing device 210, OTN 220, and/or P-OTN 230 may include additional components, fewer components, different components, or differently arranged components than those shown in FIGS. 3A-3C. Additionally, or alternatively, one or more components of routing device 210, OTN 220, and/or P-OTN 230 may perform one or more functions described as being performed by another one or more components of routing device 210, OTN 220, and/or P-OTN 230.

Figure 4:
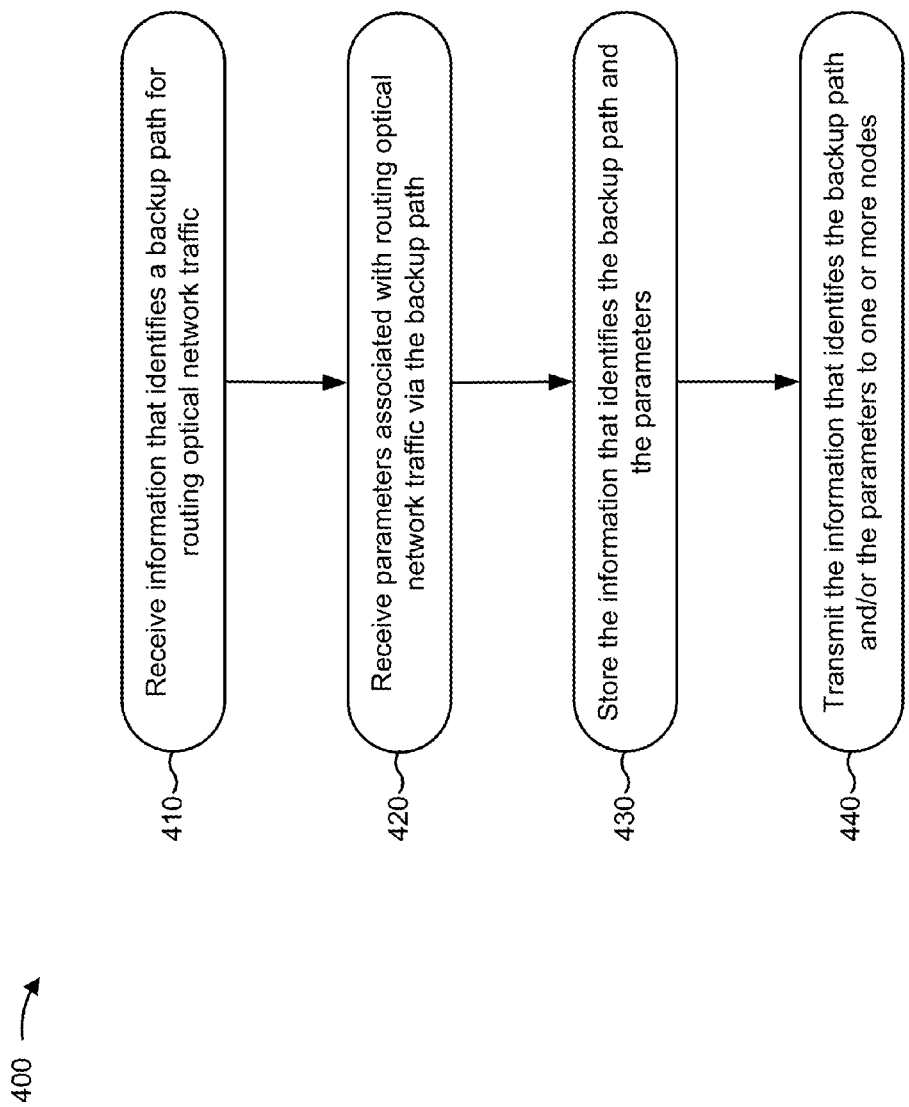
FIG. 4 is a flow chart of an example process for setting up a backup path to be used to route network traffic.

FIG. 4 is a flow chart of an example process 400 for setting up a backup path to be used to route network traffic. In some implementations, one or more process blocks of FIG. 4 may be performed by P-OTN 230. In some implementations, one or more process blocks of FIG. 4 may be performed by another device or a group of devices separate from or including P-OTN 230, such as routing device 210 and/or OTN 220.

As shown in FIG. 4, process 400 may include receiving information that identifies a backup path for routing optical network traffic (block 410), and receiving parameters associated with routing optical network traffic via the backup path (block 420). For example, P-OTN 230 may receive, from an operator and/or another device, information that identifies a backup path for routing optical network traffic in the event of a failure on a main path. The backup path may include one or more OTNs 220 via which the network traffic is to be routed. The information that identifies the backup path may specify an order in which OTNs 220 are to be traversed by the routed network traffic.

Additionally, or alternatively, P-OTN 230 may receive, from an operator and/or another device, a parameter associated with routing the optical network traffic via the backup path. In some implementations, the parameter may include a switchover condition that, when satisfied, causes P-OTN 230 to route network traffic via the backup path. For example, the switchover condition may specify that P-OTN 230 is to route traffic associated with a particular identifier (e.g., a label in a packet header) via the backup path. Additionally, or alternatively, the switchover condition may specify that P-OTN 230 is to route traffic via the backup path when a threshold quantity of packets (e.g., associated with the identifier) are received by P-OTN 230 within a particular time period.

In some implementations, the switchover condition may specify that P-OTN 230 is to route traffic via the backup path based on a notification received by P-OTN 230. For example, routing device 210 may determine that there is a failure in the main path, and may transmit a message to P-OTN 230 specifying that P-OTN 230 is to route traffic via the backup path.

In some implementations, the switchover condition may specify that P-OTN 230 is to route traffic via the backup path based on an operations, administration, and management (OAM) message received by P-OTN 230. An OAM message, as used herein, may refer to a message defined based on the Institute of Electrical and Electronics Engineers (IEEE) 802.3ah standard. In some implementations, routing device 210 may determine that there is a failure in the main path (e.g., by receiving an OAM fault message). Routing device 210 may transmit, to P-OTN 230, an OAM deactivate message, which may instruct P-OTN 230 to stop routing traffic (e.g., first network traffic) via the main path. Additionally, or alternatively, routing device 210 may transmit, to P-OTN 230, an OAM activate message, which may instruct P-OTN 230 to provision the backup path for routing first network traffic, and/or to begin routing the first network traffic via the backup path. In some implementations, the OAM activate message may instruct P-OTN 230 to pre-empt routing of second network traffic via the backup path.

The parameter may include, in some implementations, a pre-emption mode that specifies a manner in which P-OTN 230 (and/or an OTN 220 on the backup path) is to handle traffic that was being routed via the backup path before the failure occurred. For example, first network traffic may be routed via the main path, and second network traffic may be routed via the backup path. When a failure occurs, P-OTN 230 may pre-empt routing (e.g., transmission) of the second network traffic via the backup path, in favor of the first network traffic.

The pre-emption mode may specify, for example, that the second network traffic is to be dropped, re-routed, and/or de-prioritized. Based on the pre-emption mode, P-OTN 230 (and/or an OTN 220 on the backup path) may drop the second network traffic (e.g., may not route and/or transmit the traffic), may re-route the second network traffic (e.g., via a path other than the backup path), and/or may de-prioritize the second network traffic (e.g., may decrease a priority level of the second network traffic to a priority level lower than that of the first network traffic). In some implementations, the pre-emption mode may specify that different traffic (e.g., with different labels) be handled differently when switching from the main path to the backup path. For example, the traffic may include a quality of service level identifier, and traffic with a higher quality of service level may be prioritized over traffic with a lower quality of service level.

Additionally, or alternatively, the parameter may include a switchback condition that, when satisfied, causes P-OTN 230 to stop routing the first network traffic via the backup path, and route the first network traffic via the main path. For example, the switchback condition may specify that P-OTN 230 is to route traffic associated with a particular identifier (e.g., a label in a packet header) via the main path. Additionally, or alternatively, the switchback condition may specify that P-OTN 230 is to route traffic via the main path when a threshold quantity of traffic (e.g., associated with the identifier) is received by P-OTN 230 within a particular time period, and/or when a particular amount of time has passed since P-OTN 230 has received traffic associated with a particular identifier.

In some implementations, the switchback condition may specify that P-OTN 230 is to route traffic via the main path based on a notification received by P-OTN 230. For example, routing device 210 may determine that the failure in the main path has been resolved, and may transmit a message to P-OTN 230 specifying that P-OTN 230 is to route traffic via the main path.

In some implementations, the switchback condition may specify that P-OTN 230 is to route traffic via the main path based on an OAM message received by P-OTN 230. For example, routing device 210 may determine that the failure in the main path has been restored (e.g., by receiving an OAM fault clear message). Routing device 210 may transmit, to P-OTN 230, an OAM activate message, which may instruct P-OTN 230 to begin routing traffic (e.g., first network traffic) via the main path (and/or to provision the main path). Additionally, or alternatively, routing device 210 may transmit, to P-OTN 230, an OAM deactivate message, which may instruct P-OTN 230 to provision the backup path for routing second network traffic, and/or to begin routing the second network traffic via the backup path (and/or to stop routing the first network traffic via the backup path).

As further shown in FIG. 4, process 400 may include storing the information that identifies the backup path and the parameters (block 430), and transmitting the information that identifies the backup path and/or the parameters to one or more nodes (block 440). For example, P-OTN 230 may store, in a data structure, the information that identifies the backup path and the parameters. P-OTN 230 may use the information stored in the data structure to determine a backup path for routing network traffic when there is a failure in a main path. In some implementations, P-OTN 230 may use the information stored in the data structure to determine when to route traffic over the backup path, based on a switchover criteria, and when to route traffic over the main path, based on a switchback criteria. Additionally, or alternatively, P-OTN 230 may use the information stored in the data structure to determine how to handle network traffic that was being routed over the backup path prior to the failure, based on a pre-emption mode.

In some implementations, P-OTN 230 may transmit the information that identifies the backup path and/or the parameters to one or more OTNs 220 on the backup path. For example, P-OTN 230 may establish a backup path using multiprotocol label switching (MPLS) techniques. P-OTN 230 may transmit information to one or more OTNs 220 that identifies one or more label-switch paths (LSPs) for routing network traffic. OTNs 220 may store the information in a routing table. When an OTN 220 receives traffic with an LSP label, OTN 220 may look up the label in the routing table to determine another OTN 220 (and/or P-OTN 230) to which the traffic is to be routed, and may transmit the traffic to the appropriate OTN 220. For example, the routing table may specify that traffic received by OTN 220 at a particular input port be transmitted by OTN 220 at a particular output port. In this way, P-OTN 230 and/or OTNs 220 may establish cross-connects that control the flow of traffic via the backup path (or other paths).

While a series of blocks has been described with regard to FIG. 4, the blocks and/or the order of the blocks may be modified in some implementations. Additionally, or alternatively, non-dependent blocks may be performed in parallel.

FIG. 5 is a diagram of an example data structure 500 for storing information associated with a backup path. Data structure 500 may be stored in a memory device (e.g., a RAM, a DRAM, etc.) associated with one or more devices and/or components shown in FIGS. 2 and 3. For example, data structure 500 may be stored by P-OTN 230.

Data structure 500 may include a collection of fields, such as a main path field 510, a label field 520, a backup path field 530, a switchover condition field 540, a pre-emption mode field 550, and a switchback condition field 560.

Main path field 510 may store information that identifies a main path for routing network traffic (e.g., between routing devices 210). For example, the main path may include one or more OTNs 220 and/or P-OTNs 230, and main path field 510 may include one or more OTN identifiers that specify the OTNs 220 and/or P-OTNs 230 via which traffic is to be routed on the main path.

Label field 520 may store information that identifies a label for traffic that is to be routed via a backup path when the main path, identified in main path field 510, experiences a failure. For example, the label may include a traffic identifier appended to the traffic. As another example, the label may include a string of characters included in a packet header, and P-OTN 230 may read the packet header to determine a label associated with a packet. Different labels may be associated with different traffic flows, different priorities, different quality of service levels, etc.

Backup path field 530 may store information that identifies a backup path for routing traffic, identified by the label in label field 520, when there is a failure in a main path. For example, the backup path may include one or more OTNs 220 and/or P-OTNs 230, and backup path field 530 may include one or more OTN identifiers that specify the OTNs 220 and/or P-OTNs 230 via which traffic is to be routed on the backup path. In some implementations, backup path field 530 may store an indication that traffic associated with a label, identified in label field 520, is not to be routed via a backup path (e.g., is to be dropped).

Switchover condition field 540 may store information that identifies a condition that, when satisfied, causes P-OTN 230 to stop routing traffic, identified by the label in label field 520, via a main path, and to begin routing the traffic via the backup path identified in backup path field 530. For example, the switchover condition may specify an amount of traffic received in a particular time period, a notification from another device, and/or an OAM message.

Pre-emption mode field 550 may store information that identifies a manner in which traffic being routed on the backup path, identified in backup path field 530, before the failure in the main path, is to be handled when the failure occurs. For example, the pre-emption mode may specify that the traffic on the backup path is to be dropped, re-routed, and/or de-prioritized. In some implementations, pre-emption mode field 550 may identify one or more nodes for re-routing the traffic. Additionally, or alternatively, pre-emption mode field 550 may store information that identifies a manner in which traffic, identified by label field 520, is to be handled after the failure. For example, certain traffic originally routed via the main path may be dropped after the failure occurs.

Switchback condition field 560 may store information that identifies a condition that, when satisfied, causes P-OTN 230 to stop routing traffic, identified by the label in label field 520, via the backup path, identified in backup path field 530, and to begin routing the traffic via the main path identified in main path field 510. For example, the switchback condition may specify an amount of traffic received in a particular time period, a notification from another device, and/or an OAM message.

Information associated with a single instance of re-routing traffic from a main path to a backup path may be conceptually represented as a single row in data structure 500. For example, the first row in data structure 500 may correspond to traffic labeled as "LSP1" that is routed via main path "A-B-C-D" prior to a failure in the main path. After a failure in the main path "A-B-C-D," the LSP1 traffic may be routed via backup path "A-E-F-G-D." P-OTN 230 may detect a failure in the main path, and may switchover the LSP1 traffic from the main path to the backup path, when P-OTN 230 receives more than 100 LSP1 packets per millisecond. When re-routing the LSP1 traffic on the backup path, P-OTN 230 may drop traffic that was previously routed via the backup path prior to the failure. When P-OTN 230 detects that fewer than 100 LSP1 packets are being received per millisecond, P-OTN 230 may stop routing the traffic via the backup path.

Data structure 500 includes fields 510-560 for explanatory purposes. In practice, data structure 500 may include additional fields, fewer fields, different fields, or differently arranged fields than those illustrated in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user, and/or information automatically provided by a device.

Figure 6A:
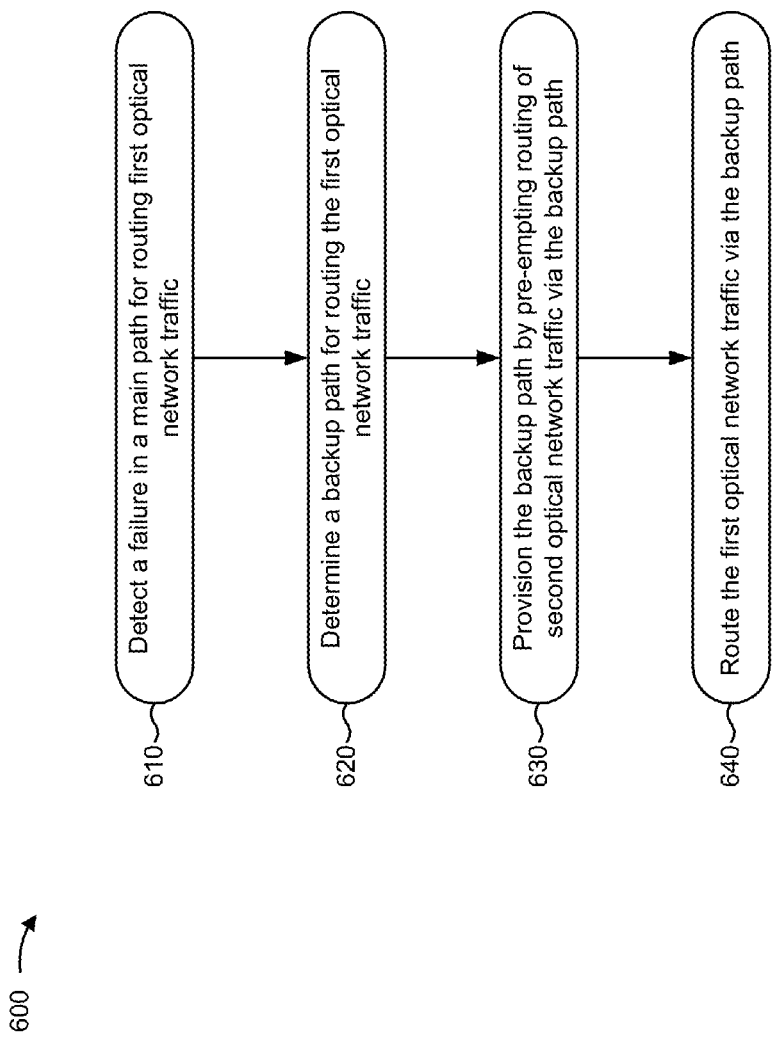
FIGS. 6A and 6B are flow charts of an example process for provisioning and re-provisioning a backup path for routing network traffic.
Figure 6B:
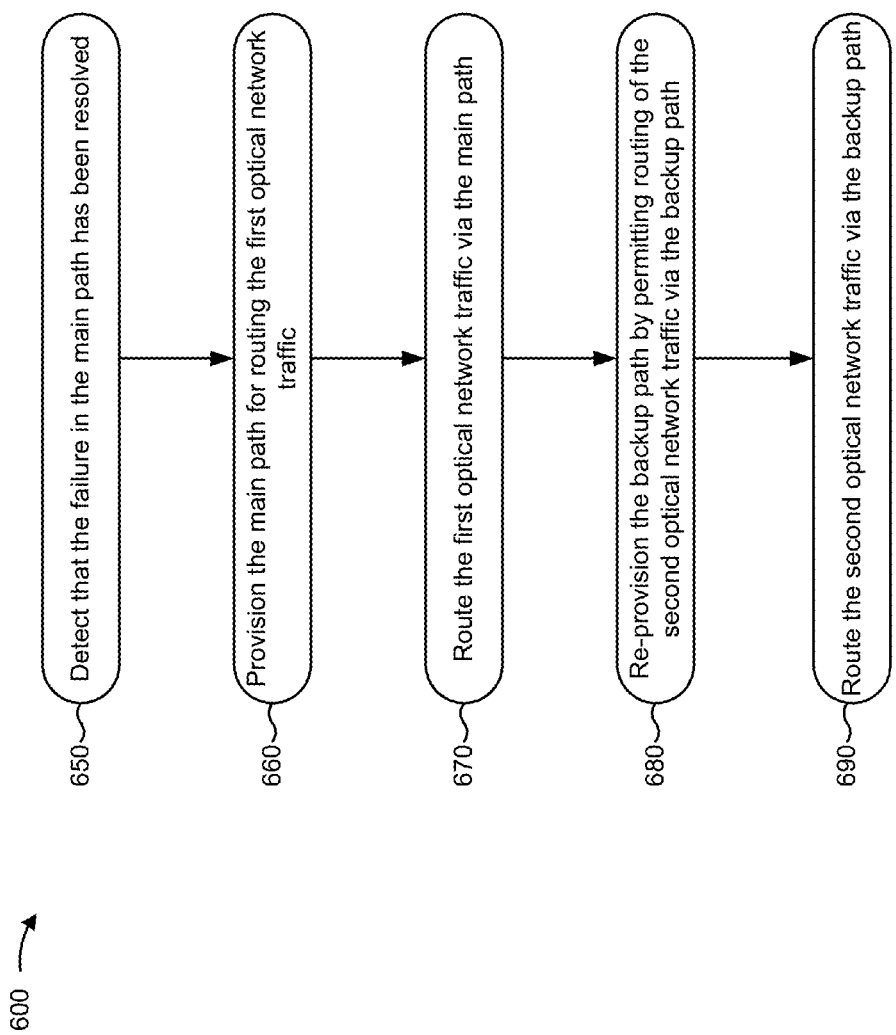

FIGS. 6A and 6B are flow charts of an example process 600 for provisioning and re-provisioning a backup path for routing network traffic. In some implementations, one or more process blocks of FIGS. 6A and 6B may be performed by P-OTN 230. In some implementations, one or more process blocks of FIGS. 6A and 6B may be performed by another device or a group of devices separate from or including P-OTN 230, such as routing device 210 and/or OTN 220.

As shown in FIG. 6A, process 600 may include detecting a failure in a main path for routing first optical network traffic (block 610). For example, P-OTN 230 may detect a failure in a main path that routes first optical network traffic. In some implementations, P-OTN 230 may detect the failure based on a switchover condition. For example, P-OTN 230 may detect that a failure in the main path has occurred when P-OTN 230 receives traffic associated with a particular identifier (e.g., a label in a packet header). Additionally, or alternatively, P-OTN 230 may detect that a failure in the main path has occurred when P-OTN 230 receives a threshold quantity of traffic (e.g., associated with the identifier) within a particular time period.

In some implementations, routing device 210 may detect the failure (e.g., by determining that an acknowledgement packet has not been received from a destination device). Based on detecting the failure, routing device 210 may tag traffic associated with the main path, such as by appending an identifier to a packet header, and may transmit the traffic with the identifier to P-OTN 230. P-OTN 230 may detect the identifier, and may determine that the failure in the main path has occurred based on detecting the identifier. Alternatively, P-OTN 230 may detect the failure, may tag traffic associated with the main path, and may transmit the traffic to the appropriate OTN 220 on the backup path.

In some implementations, P-OTN 230 may detect a failure based on receiving a notification. For example, routing device 210 may determine that there is a failure in the main path, and may transmit a message to P-OTN 230 specifying that P-OTN 230 is to route traffic via the backup path. In some implementations, P-OTN 230 may detect a failure based on receiving an OAM message (e.g., from routing device 210).

As further shown in FIG. 6A, process 600 may include determining a backup path for routing the first optical network traffic (block 620), and provisioning the backup path by pre-empting routing of second optical network traffic via the backup path (block 630). For example, P-OTN 230 may determine a backup path based on stored information (e.g., information stored in data structure 500) and/or information received from another device (e.g., routing device 210). The backup path may include one or more OTNs 220 and/or P-OTNs 230.

P-OTN 230 may provision the backup path by, for example, reserving bandwidth on the backup path for routing the first optical network traffic. P-OTN 230 may provision bandwidth using shared mesh protection (SMP) activation. For example, P-OTN 230 may transmit a message, to nodes on the backup path, instructing the nodes to reserve the bandwidth for the first optical network traffic. In some implementations, the message may indicate that second optical network traffic, routed via the backup path prior to the failure, is to be dropped. Alternatively, the message may indicate that the second optical network traffic is to be re-routed, and may identify one or more nodes to be used for re-routing the second optical network traffic. Additionally, or alternatively, the message may indicate that the second optical network traffic is to be de-prioritized, and that the first optical network traffic is to receive a higher priority than the second optical network traffic (e.g., that the second optical network traffic may only be transmitted if all of the queued first optical network traffic has been transmitted).

In some implementations, P-OTN 230 may provision multiple backup paths (e.g., using different ports on the same OTNs 220 and/or a different set of OTNs 220 for the different paths). P-OTN 230 may determine a quality of service level associated with incoming traffic (e.g., based on a quality of service identifier included in a packet), and may route the incoming traffic via a particular path based on the quality of service level. In this way, P-OTN 230 may guarantee quality of service levels for network traffic. Additionally, or alternatively, P-OTN 230 may route incoming traffic over the multiple backup paths based on a load balancing algorithm. In some implementations, P-OTN 230 may determine a delay associated with the multiple backup paths, and may route traffic, destined for a particular destination, via multiple paths with a similar delay, to avoid re-ordering problems at the destination.

As further shown in FIG. 6A, process 600 may include routing the first optical network traffic via the backup path (block 640). For example, P-OTN 230 may transmit the first optical network traffic to a next OTN 220 in the backup path, which may transmit the network traffic to another OTN 220 in the backup path, etc., until the network traffic reaches a terminal destination (e.g., routing device 210). In some implementations, P-OTN 230 and/or OTN 220 may determine a next node to which the traffic is to be transmitted, and/or an output port for transmitting the traffic, based on information stored in a routing table, based on an identifier associated with the incoming traffic, and/or based on an input port on which the traffic is received.

As shown in FIG. 6B, process 600 may include detecting that the failure in the main path has been resolved (block 650). For example, P-OTN 230 may detect that a failure, in a main path for routing first optical network traffic, has been resolved. In some implementations, P-OTN 230 may detect that the failure has been resolved based on a switchback condition. For example, P-OTN 230 may detect that a failure has been resolved when P-OTN 230 receives traffic associated with a particular identifier (e.g., a label in a packet header) and/or stops receiving traffic associated with a particular identifier. Additionally, or alternatively, P-OTN 230 may detect that a failure has been resolved when P-OTN 230 receives a threshold quantity of traffic (e.g., associated with the identifier) within a particular time period and/or stops receiving a threshold quantity of traffic within a particular time period.

In some implementations, routing device 210 may determine that the failure has been resolved (e.g., by determining that an acknowledgement packet has been received from a destination device). Based on determining that the failure has been resolved, routing device 210 may tag traffic associated with the main path, such as by appending an identifier to a packet header, and may transmit the traffic with the identifier to P-OTN 230. P-OTN 230 may detect the identifier, and may determine that the failure in the main path has been resolved based on detecting the identifier. Alternatively, P-OTN 230 may determine that the failure has been resolved, may tag traffic associated with the main path, and may transmit the traffic to the appropriate OTN 220 on the main path.

In some implementations, P-OTN 230 may detect that a failure has been resolved based on receiving a notification. For example, routing device 210 may determine that the failure has been resolved, and may transmit a message to P-OTN 230 specifying that P-OTN 230 is to route traffic via the main path. In some implementations, P-OTN 230 may detect that the failure has been resolved based on receiving an OAM message (e.g., from routing device 210).

As further shown in FIG. 6B, process 600 include provisioning the main path for routing the first optical network traffic (block 660), and routing the first optical network traffic via the main path (block 670). For example, P-OTN 230 may provision the main path for routing the first optical network traffic by, for example, reserving bandwidth on the main path for routing the first optical network traffic. P-OTN 230 may transmit a message, to nodes on the main path, instructing the nodes to reserve the bandwidth for the first optical network traffic. P-OTN 230 may transmit the first optical network traffic to a next OTN 220 in the main path, which may transmit the network traffic to another OTN 220 in the main path, etc., until the network traffic reaches a terminal destination (e.g., routing device 210).

As further shown in FIG. 6B, process 600 may include re-provisioning the backup path by permitting routing of the second optical network traffic via the backup path (block 680), and routing the second optical network traffic via the backup path (block 690). For example, P-OTN 230 may provision the backup path for routing the second optical network traffic by, for example, reserving bandwidth on the backup path for routing the second optical network traffic. P-OTN 230 may transmit a message, to nodes on the backup path, instructing the nodes to reserve the bandwidth for the second optical network traffic. P-OTN 230 may transmit the second optical network traffic to a next OTN 220 in the backup path, which may transmit the network traffic to another OTN 220 in the backup path, etc., until the network traffic reaches a terminal destination (e.g., routing device 210).

While a series of blocks has been described with regard to FIGS. 6A and 6B, the blocks and/or the order of the blocks may be modified in some implementations. Additionally, or alternatively, non-dependent blocks may be performed in parallel.

Figure 7A:
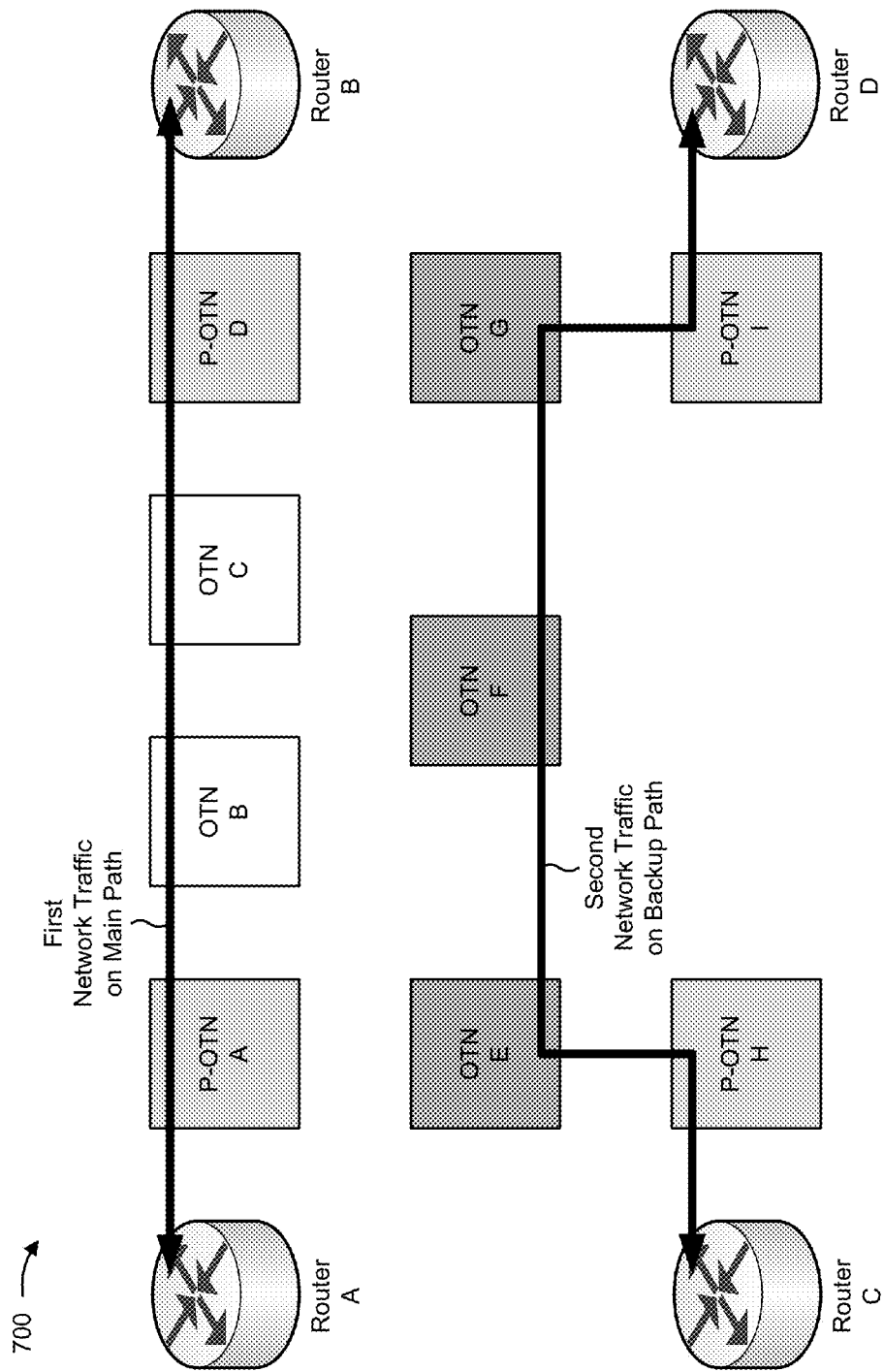
FIGS. 7A-7C are diagrams of an example implementation relating to the example process shown in FIGS. 6A and 6B.
Figure 7B:
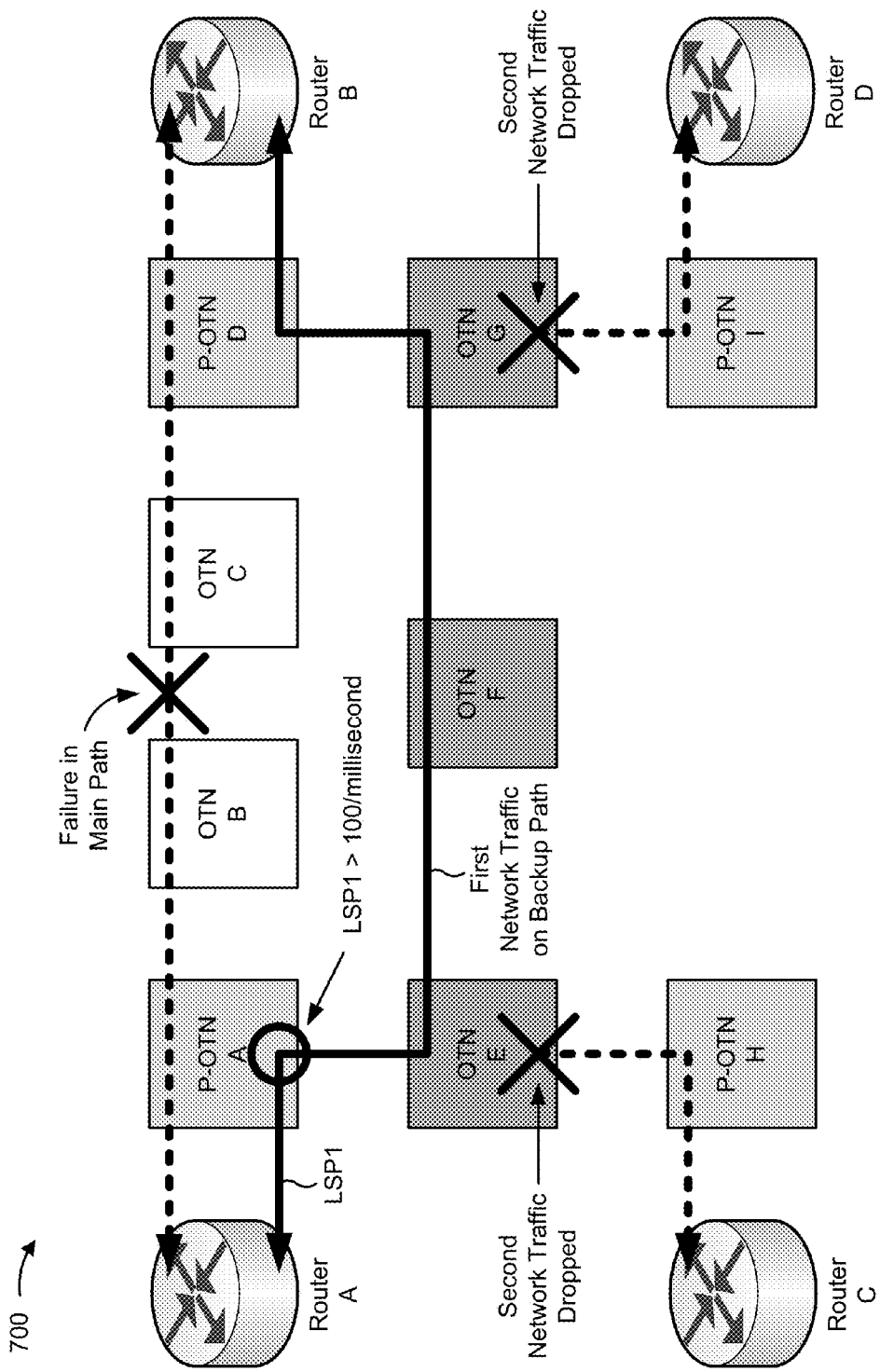
Figure 7C:
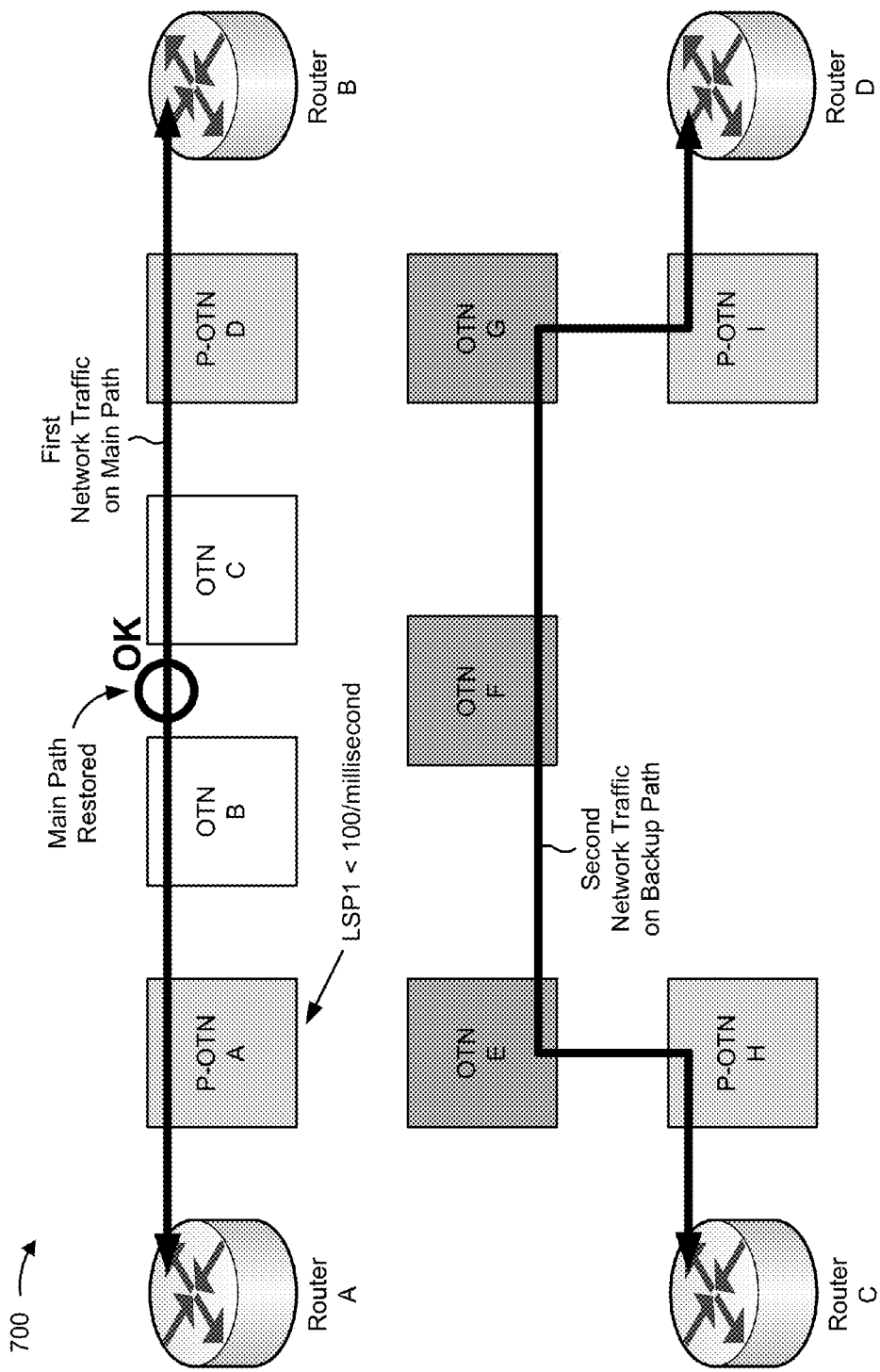

FIGS. 7A-7C are diagrams of an example implementation 700 relating to the example process shown in FIGS. 6A and 6B. Implementation 700 depicts a scenario where second network traffic, routed via the backup path prior to a failure in the main path, is pre-empted by being dropped.

As shown in FIG. 7A, assume that an optical network routes first network traffic on a main path from Router A to Router B via P-OTN A, OTN B, OTN C, and P-OTN D. Further assume that the optical network routes second network traffic on a backup path from Router C to Router D via P-OTN H, OTN E, OTN F, OTN G, and P-OTN I.

At a later time, assume that a failure occurs in the main path, as shown in FIG. 7B. P-OTN A may detect the failure. For example, P-OTN A may detect the failure by determining that more than 100 packets labeled as LSP1 are being received per millisecond. P-OTN A may route the first network traffic from Router A to Router B via the backup path P-OTN A, OTN E, OTN F, OTN G, and P-OTN D. P-OTN A may provision the backup path by instructing other OTNs on the backup path (e.g., OTN E, OTN F, and/or OTN G) to drop the second network traffic.

At a later time, assume that the failure in the main path is resolved, as shown in FIG. 7C. P-OTN A may detect that the failure has been resolved by, for example, determining that fewer than 100 packets labeled as LSP1 are being received per millisecond (e.g., from Router A). For example, Router A may only label traffic with LSP1 when Router A detects a failure in the main path, and Router A may label traffic using a different label when the failure has been resolved. P-OTN A may provision the main path for routing the first network traffic, and may route the first network traffic via the main path. Furthermore, P-OTN A may re-provision the backup path for routing the second network traffic, which may permit the second network traffic to be routed via the backup path.

As indicated above, FIGS. 7A-7C are provided as an example. Other examples are possible and may differ from what is depicted in FIGS. 7A-7C and/or what is described with regard to FIGS. 7A-7C. For example, while P-OTN A is described as performing certain operations in example implementation 700, in some implementations the operations may be performed by P-OTN D, another P-OTN, or a combination of P-OTNs (e.g., P-OTN A and P-OTN D).

Figure 8A:
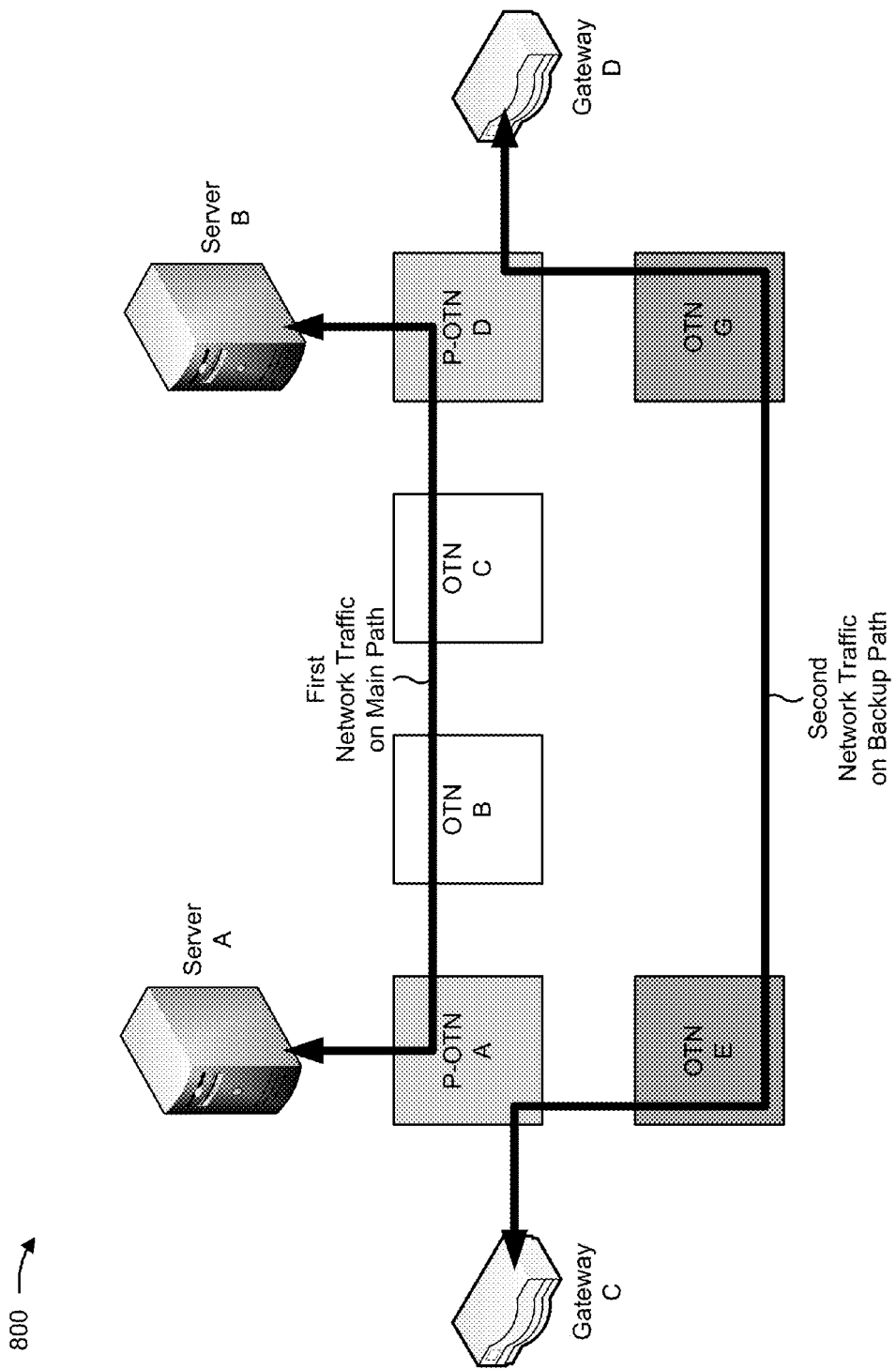
FIGS. 8A-8C are diagrams of another example implementation relating to the example process shown in FIGS. 6A and 6B.
Figure 8B:
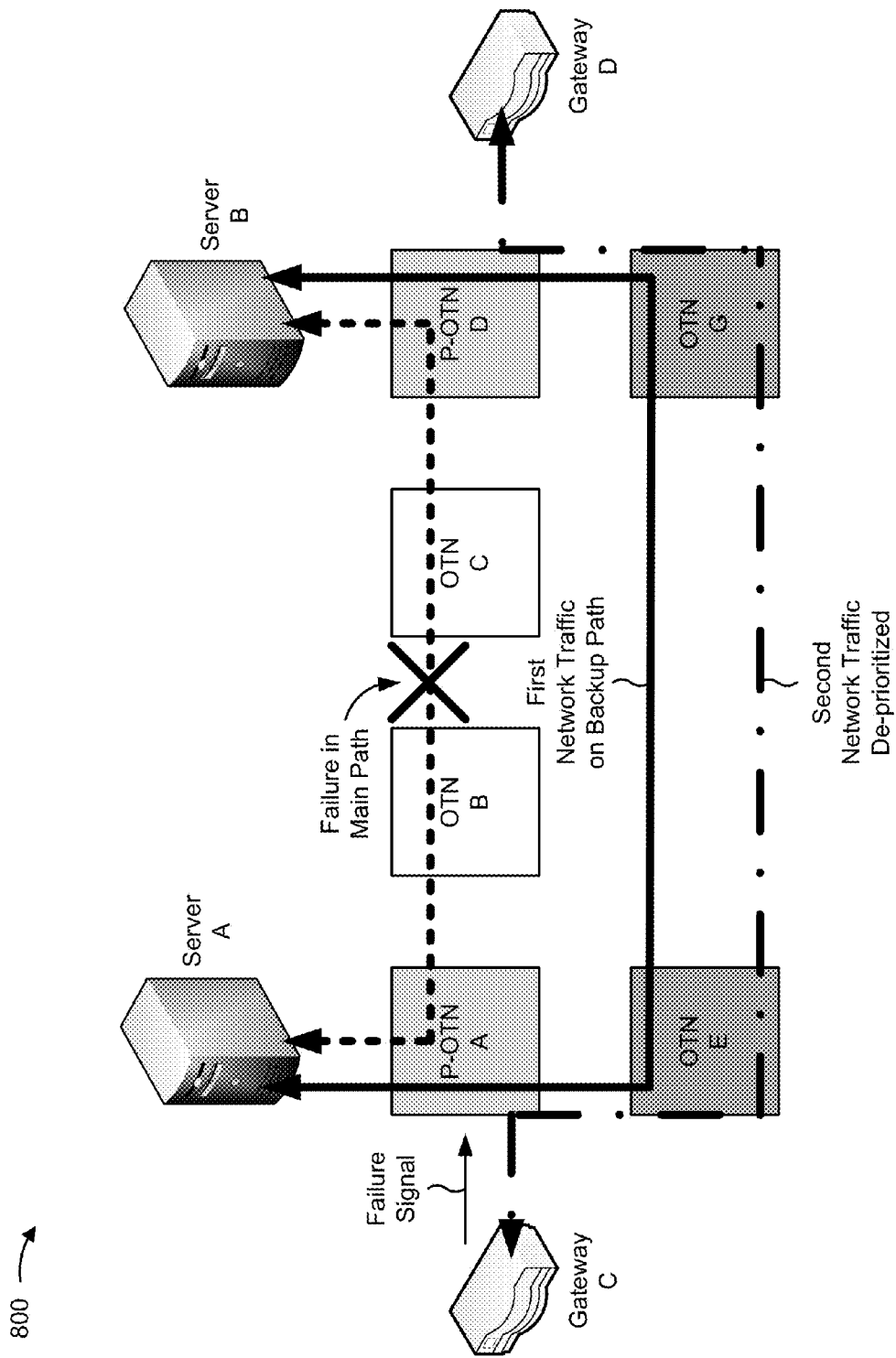
Figure 8C:
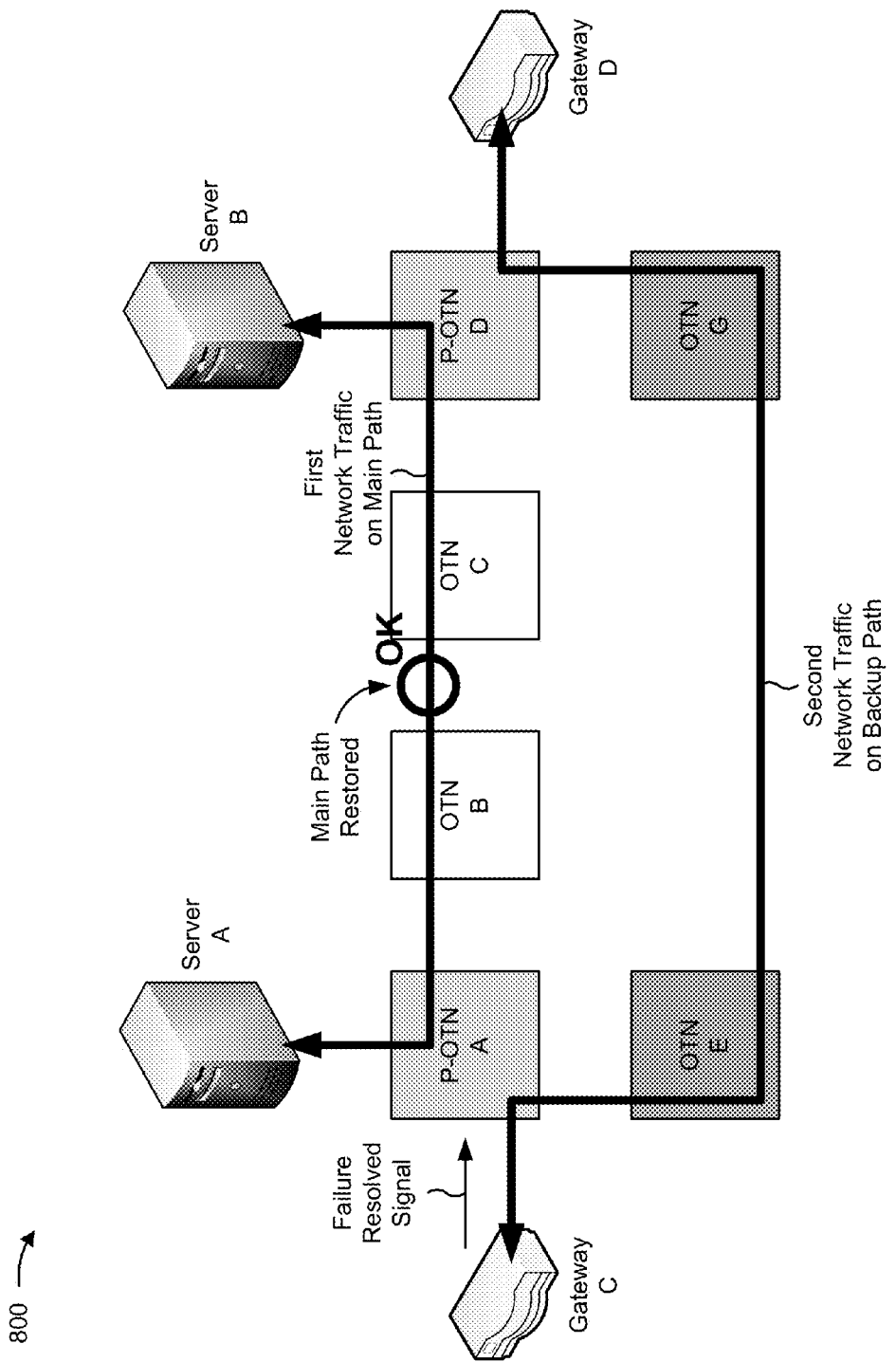

FIGS. 8A-8C are diagrams of another example implementation 800 relating to the example process shown in FIGS. 6A and 6B. Implementation 800 depicts a scenario where second network traffic, routed via the backup path prior to a failure in the main path, is pre-empted by being de-prioritized.

As shown in FIG. 8A, assume that an optical network routes first network traffic on a main path from Server A to Server B via P-OTN A, OTN B, OTN C, and P-OTN D. Further assume that the optical network routes second network traffic on a backup path from Gateway C to Gateway D via P-OTN A, OTN E, OTN G, and P-OTN D.

At a later time, assume that a failure occurs in the main path, as shown in FIG. 8B. P-OTN A may detect the failure. For example, P-OTN A may detect the failure by receiving a failure signal from Gateway C. P-OTN A may route the first network traffic from Server A to Server B via the backup path P-OTN A, OTN E, OTN G, and P-OTN D. P-OTN A may provision the backup path by de-prioritizing the second network traffic, and/or by instructing other OTNs in the backup path to de-prioritize the second network traffic.

At a later time, assume that the failure in the main path is resolved, as shown in FIG. 8C. P-OTN A may detect that the failure has been resolved by receiving, from Gateway C, a signal that the failure has been resolved. P-OTN A may provision the main path for routing the first network traffic, and may route the first network traffic via the main path. Furthermore, P-OTN A may re-provision the backup path for routing the second network traffic (e.g., by increasing and/or restoring a priority level associated with the second network traffic), which may permit the second network traffic to be routed via the backup path.

As indicated above, FIGS. 8A-8C are provided as an example. Other examples are possible and may differ from what is depicted in FIGS. 8A-8C and/or what is described with regard to FIGS. 8A-8C.

Figure 9A:
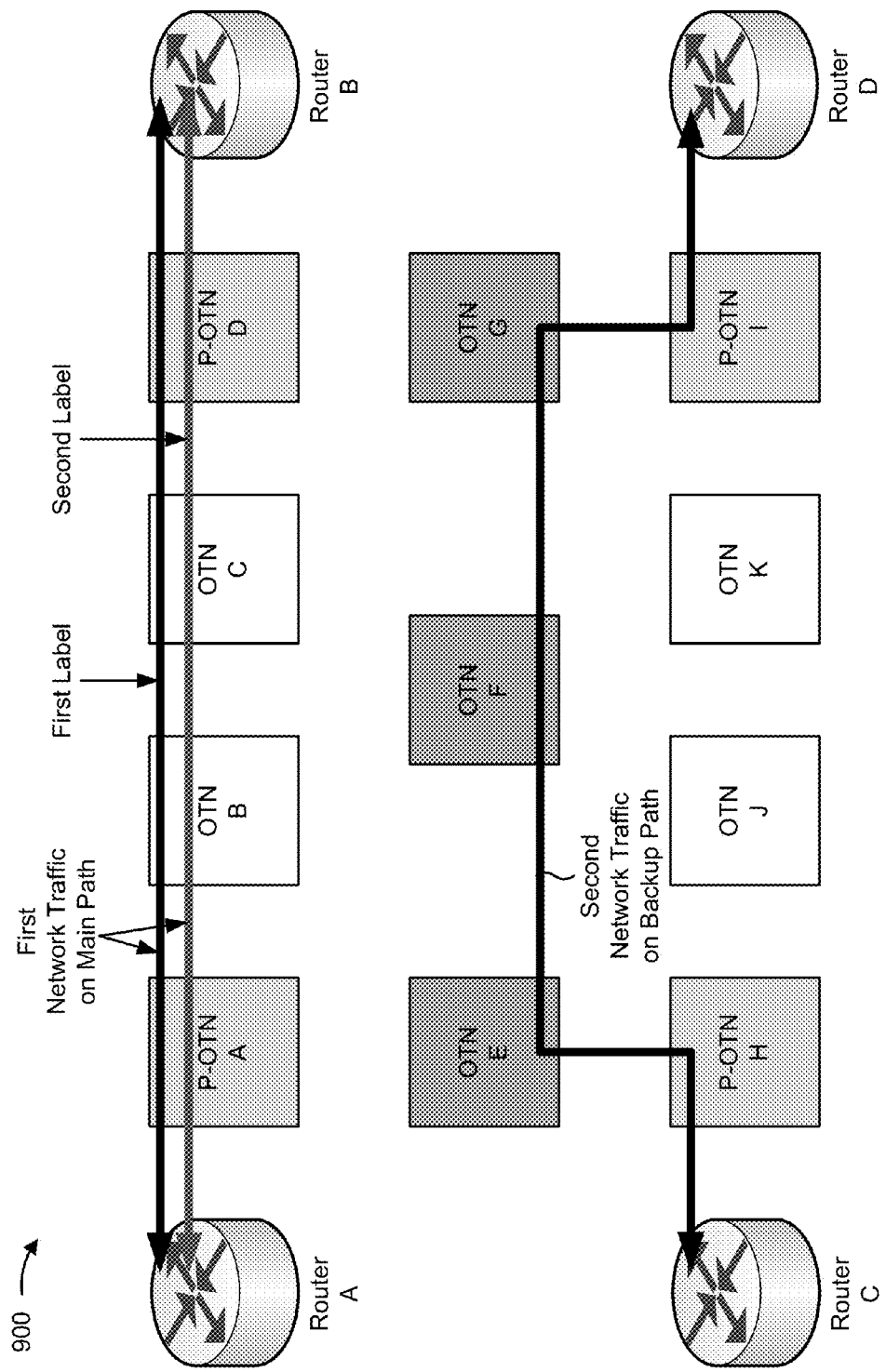
FIGS. 9A-9C are diagrams of yet another example implementation relating to the example process shown in FIGS. 6A and 6B.
Figure 9B:
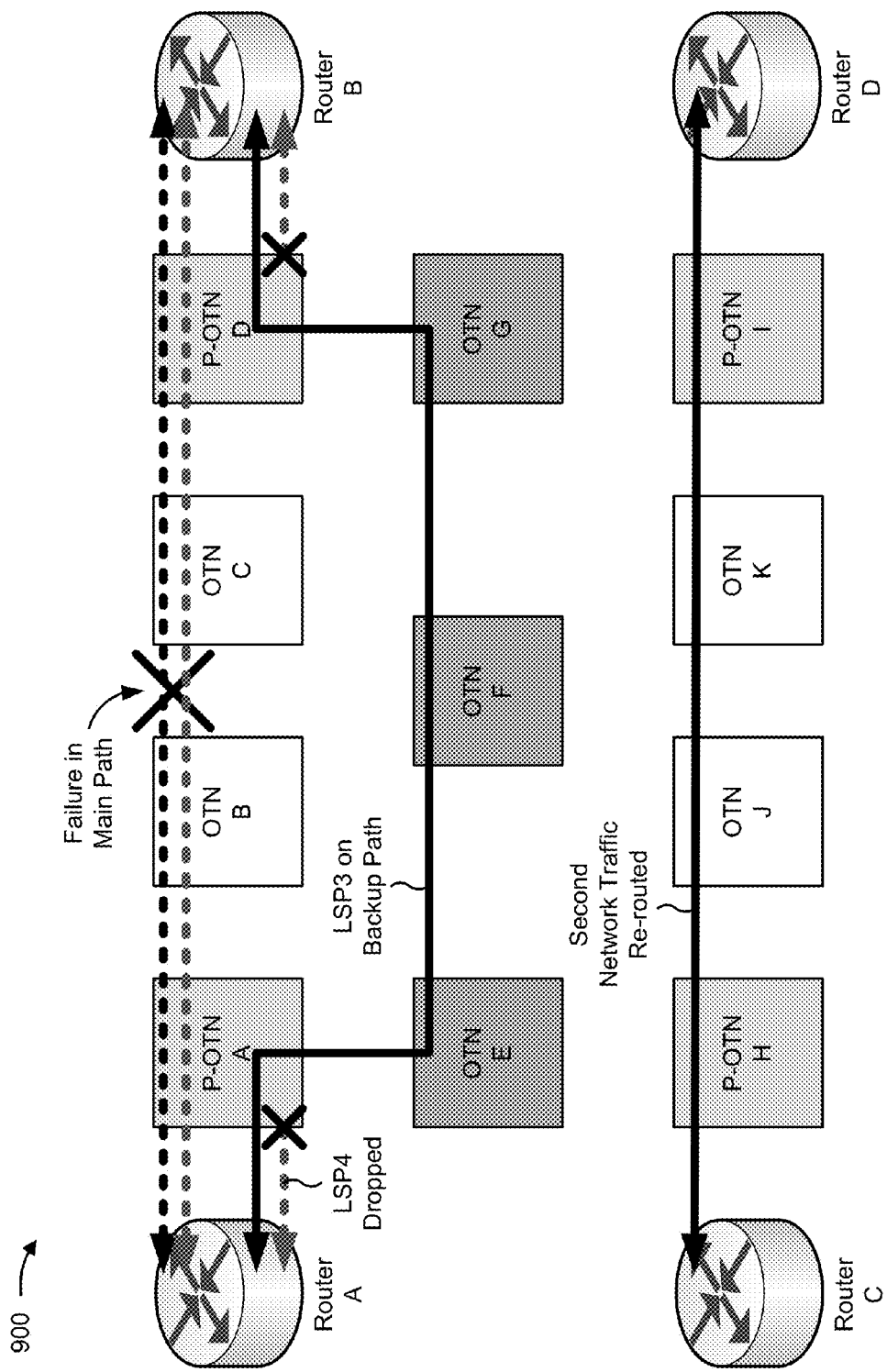
Figure 9C:
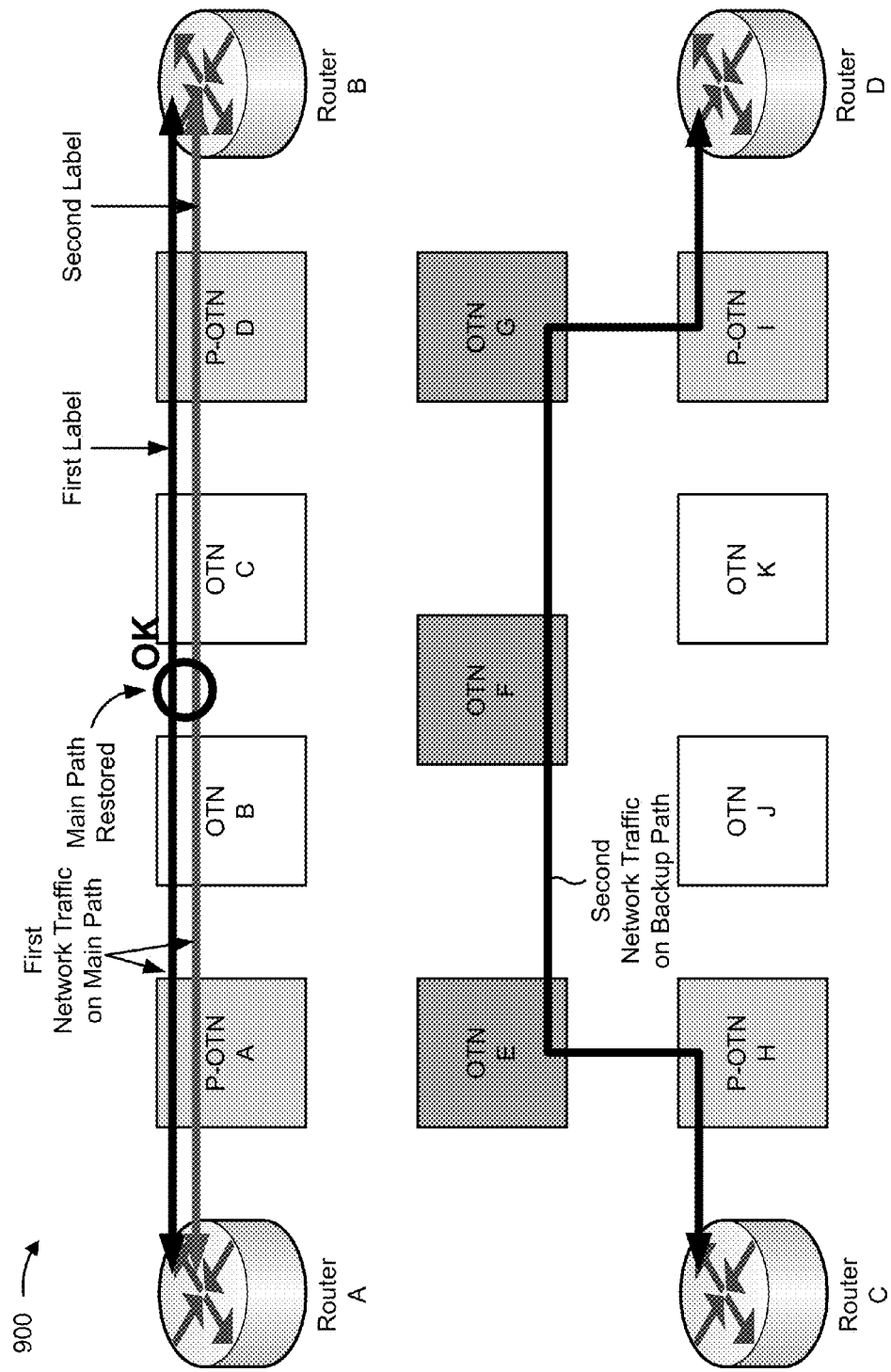

FIGS. 9A-9C are diagrams of yet another example implementation 900 relating to the example process shown in FIGS. 6A and 6B. Implementation 900 depicts a scenario where second network traffic, routed via the backup path prior to a failure in the main path, is pre-empted by being re-routed.

As shown in FIG. 9A, assume that an optical network routes first network traffic on a main path from Router A to Router B via P-OTN A, OTN B, OTN C, and P-OTN D. The first network traffic may include traffic identified by a first label associated with a high priority, and traffic identified by a second label with a low priority, as shown. Further assume that the optical network routes second network traffic on a backup path from Router C to Router D via P-OTN H, OTN E, OTN F, OTN G, and P-OTN I.

At a later time, assume that a failure occurs in the main path, as shown in FIG. 9B. P-OTN A may detect the failure. For example, P-OTN A may detect the failure by receiving a failure signal from Router A. Additionally, or alternatively, P-OTN D may detect the failure by receiving a failure signal from Router B. P-OTN A may route the first network traffic with the first label (shown as "LSP3") from Router A to Router B via the backup path P-OTN A, OTN E, OTN F, OTN G, and P-OTN D. P-OTN A may drop the first network traffic with the second label (shown as "LSP4"). In some implementations, P-OTN A may route LSP3 and drop LSP4 based on LSP3 having a higher priority than LSP4 (e.g., as identified by a quality of service identifier in LSP3 and/or LSP4 traffic). P-OTN A may provision the backup path by instructing OTNs in the backup path (e.g., OTN E, OTN F, and/or OTN G) to re-route the second network traffic. For example, P-OTN A may instruct P-OTN H to route the second network traffic from Router C to Router D via another path, such as P-OTN H, OTN J, OTN K, and P-OTN I.

At a later time, assume that the failure in the main path is resolved, as shown in FIG. 9C. P-OTN A may detect that the failure has been resolved by receiving, from Router A, a signal that the failure has been resolved. Additionally, or alternatively, P-OTN D may detect that the failure has been resolved by receiving, from Router B, a signal that the failure has been resolved. P-OTN A may provision the main path for routing the first network traffic (e.g., identified by the first label and/or the second label), and may route the first network traffic via the main path. Furthermore, P-OTN A may re-provision the backup path for routing the second network traffic (e.g., by transmitting a notification to OTN E, OTN F, OTN G, P-OTN H, P-OTN I, etc.), which may permit the second network traffic to be routed via the backup path.

As indicated above, FIGS. 9A-9C are provided as an example. Other examples are possible and may differ from what is depicted in FIGS. 9A-9C and/or what is described with regard to FIGS. 9A-9C.

Figure 10A:
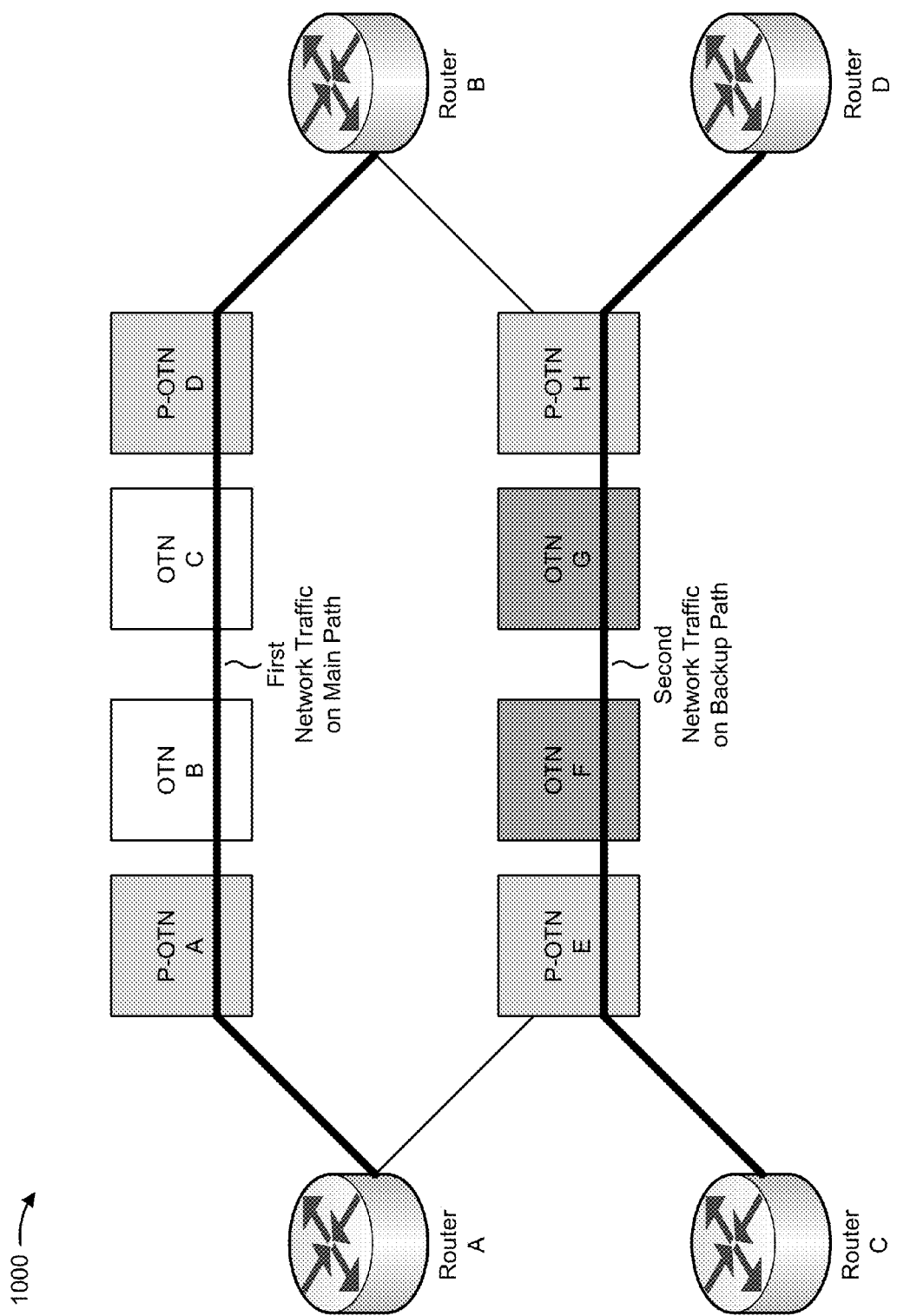
FIGS. 10A-10C are diagrams of still another example implementation relating to the example process shown in FIGS. 6A and 6B.
Figure 10B:
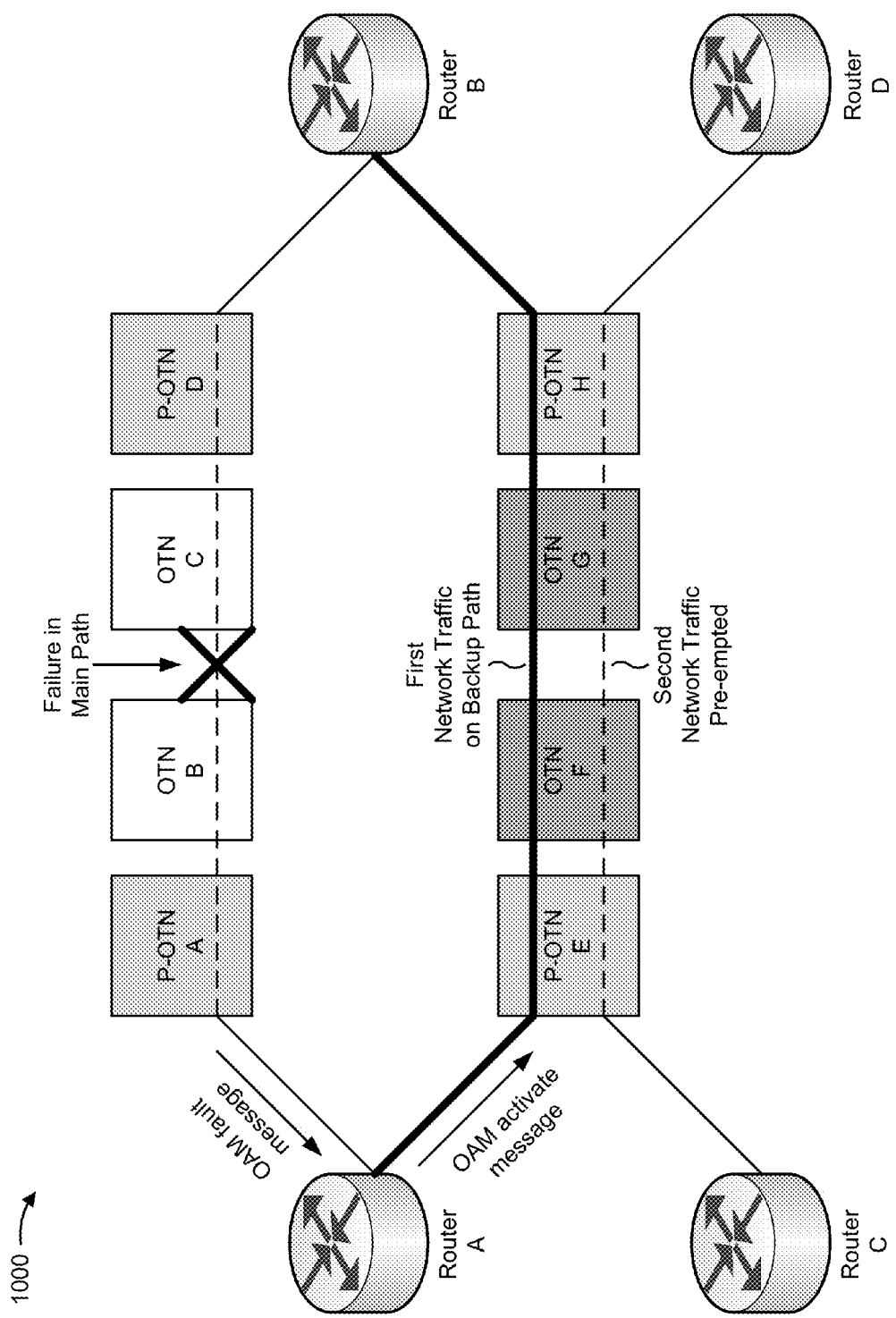
Figure 10C:
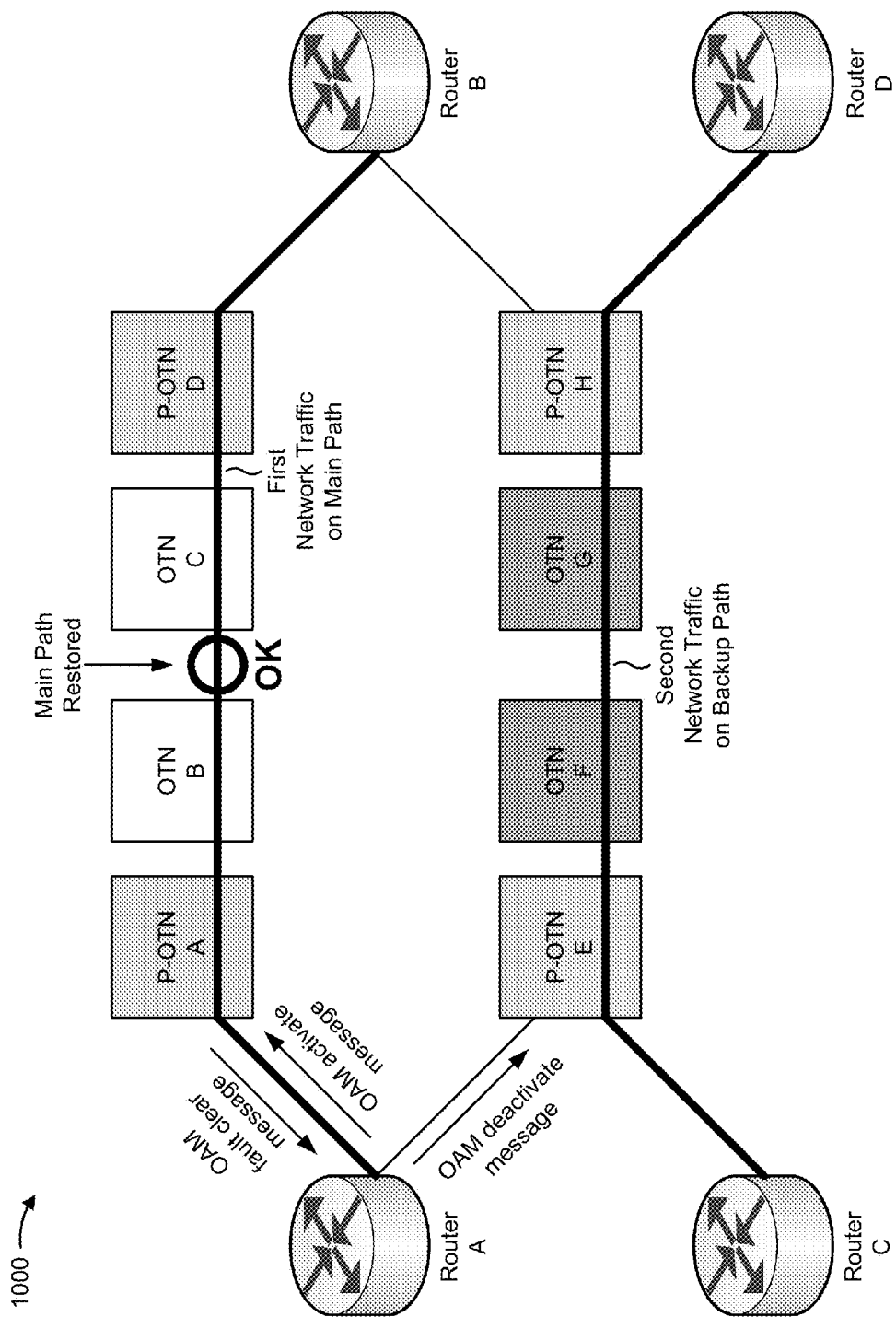

FIGS. 10A-10C are diagrams of still another example implementation 1000 relating to the example process shown in FIGS. 6A and 6B. Implementation 1000 depicts a scenario where an OAM message is used to trigger provisioning of the backup path.

As shown in FIG. 10A, assume that an optical network routes first network traffic on a main path from Router A to Router B via P-OTN A, OTN B, OTN C, and P-OTN D. Further assume that the optical network routes second network traffic on a backup path from Router C to Router D via P-OTN E, OTN F, OTN G, and P-OTN H.

At a later time, assume that a failure occurs in the main path, as shown in FIG. 10B. Router A may detect that the failure has occurred (e.g., by receiving an OAM fault message). Router A may then transmit an OAM activate message to P-OTN E. The OAM activate message may cause P-OTN E to route the first network traffic via the backup path, and may cause P-OTN E to pre-empt routing of the second network traffic via the backup path. Router A may also transmit the first network traffic to P-OTN E, which may then be routed via the backup path based on P-OTN E receiving the OAM activate message. P-OTN E may route the first network traffic from Router A to Router B via the backup path P-OTN E, OTN F, OTN G, and P-OTN H. P-OTN E may provision the backup path by instructing other OTNs on the backup path (e.g., OTN F, OTN G, and/or P-OTN H) to pre-empt routing of the second network traffic.

At a later time, assume that the failure in the main path is resolved, as shown in FIG. 10C. Router A may detect that the failure has been resolved (e.g., by receiving an OAM fault clear message). Router A may then transmit an OAM deactivate message to P-OTN E, and an OAM activate message to P-OTN A. The OAM deactivate message may cause P-OTN E to stop routing the first network traffic via the backup path, to re-provision the backup path for routing other network traffic (e.g., the second network traffic), and to route the other network traffic via the backup path. The OAM activate message may cause P-OTN A to provision the main path for routing the first network traffic, and to route the first network traffic via the main path. Router A may also transmit the first network traffic to P-OTN A, which may then be routed via the main path based on P-OTN A receiving the OAM activate message.

As indicated above, FIGS. 10A-10C are provided as an example. Other examples are possible and may differ from what is depicted in FIGS. 10A-10C and/or what is described with regard to FIGS. 10A-10C. For example, while Router A, P-OTN A, and P-OTN E are described as performing certain operations in example implementation 1000, in some implementations the operations may be performed by Router B, P-OTN D, P-OTN H, another Router, another P-OTN, or a combination of Routers and/or P-OTNs (e.g., Router A and Router B, P-OTN A and P-OTN D, etc.).

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

Packet, as used herein, may refer to a packet, a datagram, a cell, a fragment of a packet, a fragment of a datagram, a fragment of a cell, or any other type or arrangement of data that may be carried at a specified communication layer. Traffic, as used herein, may refer to a packet or another container (e.g., a frame) used to package and/or transport information.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
one or more nodes to:
  determine a failure in a first path for routing first optical network traffic between a first set of networking devices,
    the first path including a first set of optical transport nodes;
  determine, based on determining the failure, a second path for routing the first optical network traffic between the first set of networking devices,
    the second path including a second set of optical transport nodes that route second optical network traffic between a second set of networking devices,
    the second set of optical transport nodes including at least one node that is not included in the first set of optical transport nodes;
  pre-empt routing of the second optical network traffic via the second path based on determining the second path; and
  route the first optical network traffic via the second path, after pre-empting routing of the second optical network traffic via the second path,
  where the one or more nodes are further to:
    determine that an amount of traffic, identified with a particular label and received in a particular time period, satisfies a threshold; and
  where the one or more nodes, when determining the failure, are further to:
    determine the failure based on determining that the amount of traffic satisfies the threshold.

2. The system of claim 1, where the one or more nodes are further to:
  receive a notification indicating that the failure in the first path has occurred; and
  where the one or more nodes, when determining the failure, are further to:
    determine the failure based on receiving the notification.

3. The system of claim 1, where the one or more nodes are further to:
  receive an operations, administration, and management (OAM) message; and
  where the one or more nodes, when determining the failure, are further to:
    determine the failure based on receiving the OAM message.

4. The system of claim 1, where the one or more nodes, when pre-empting routing of the second optical network traffic, are further to at least one of:
  drop the second optical network traffic;
  de-prioritize the second optical network traffic to a priority level below a priority level of the first optical network traffic; or
  re-route the second optical network traffic via a path other than the first path and the second path.

5. The system of claim 1, where the one or more nodes, when routing the first optical network traffic via the second path, are further to:
  determine first labeled traffic included in the first optical network traffic and identified by a first label;

determine second labeled traffic included in the first optical network traffic and identified by a second label,
the second labeled traffic being of a lower priority than the first labeled traffic;
route the first labeled traffic via the second path; and
drop the second labeled traffic.

6. A system, comprising:
one or more nodes to:
determine a failure in a first path for routing first optical network traffic between a first set of networking devices, the first path including a first set of optical transport nodes;
determine, based on determining the failure, a second path for routing the first optical network traffic between the first set of networking devices,
the second path including a second set of optical transport nodes that route second optical network traffic between a second set of networking devices,
the second set of optical transport nodes including at least one node that is not included in the first set of optical transport nodes;
pre-empt routing of the second optical network traffic via the second path based on determining the second path; and
route the first optical network traffic via the second path, after pre-empting routing of the second optical network traffic via the second path,
where the one or more nodes are further to:
determine that the failure in the first path has been resolved, such that an acknowledgment packet has been received from a networking device of the first set of networking devices;
provision the first path for routing the first optical network traffic based on determining that the failure has been resolved;
route the first optical network traffic via the first path based on provisioning the first path;
permit routing of the second optical network traffic via the second path, after routing the first optical network traffic via the first path; and
route the second optical network traffic via the second path after permitting routing of the second optical network traffic.

7. The system of claim 6, where the one or more nodes are further to:
determine that an amount of traffic, identified with a particular label and received in a particular time period, satisfies a threshold; and
where the one or more nodes, when determining the failure, are further to:
determine the failure based on determining that the amount of traffic satisfies the threshold.

8. The system of claim 6, where the one or more nodes are further to:
receive a notification indicating that the failure in the first path has occurred; and
where the one or more nodes, when determining the failure, are further to:
determine the failure based on receiving the notification.

9. The system of claim 6, where the one or more nodes are further to:
receive an operations, administration, and management (OAM) message; and
where the one or more nodes, when determining the failure, are further to:
determine the failure based on receiving the OAM message.

10. The system of claim 6, where the one or more nodes, when pre-empting routing of the second optical network traffic, are further to at least one of:
drop the second optical network traffic;
de-prioritize the second optical network traffic to a priority level below a priority level of the first optical network traffic; or
re-route the second optical network traffic via a path other than the first path and the second path.

11. The system of claim 6, where the one or more nodes, when routing the first optical network traffic via the second path, are further to:
determine first labeled traffic included in the first optical network traffic and identified by a first label;
determine second labeled traffic included in the first optical network traffic and identified by a second label,
the second labeled traffic being of a lower priority than the first labeled traffic;
route the first labeled traffic via the second path; and drop the second labeled traffic.

12. A system, comprising:
one or more nodes to:
determine a failure in a first path for routing first optical network traffic between a first set of networking devices, the first path including a first set of optical transport nodes;
determine, based on determining the failure, a second path for routing the first optical network traffic between the first set of networking devices,
the second path including a second set of optical transport nodes that route second optical network traffic between a second set of networking devices,
the second set of optical transport nodes including at least one node that is not included in the first set of optical transport nodes;
provision the second path by dropping, re-routing, or de-prioritizing the second optical network traffic via the second path based on determining the second path; and
route the first optical network traffic via the second path based on provisioning the second path,
where the one or more nodes are further to:
determine that an amount of traffic, identified with a particular label and received in a particular time period, satisfies a threshold; and
where the one or more nodes, when determining the failure, are further to:
determine the failure based on determining that the amount of traffic satisfies the threshold.

13. The system of claim 12, where the one or more nodes are further to:
receive a notification indicating that the failure in the first path has occurred; and
where the one or more nodes, when determining the failure, are further to:
determine the failure based on receiving the notification.

14. The system of claim 12, where the one or more nodes are further to:
receive an operations, administration, and management (OAM) message; and
where the one or more nodes, when determining the failure, are further to:
determine the failure based on receiving the OAM message.

15. The system of claim 12, where the one or more nodes, when provisioning the second path, are further to at least one of:
drop the second optical network traffic;
de-prioritize the second optical network traffic to a priority level below a priority level of the first optical network traffic; or re-route the second optical network traffic via a path other than the first path and the second path.

16. The system of claim 12, where the one or more nodes, when routing the first optical network traffic via the second path, are further to:
   determine first labeled traffic included in the first optical network traffic and identified by a first label;
   determine second labeled traffic included in the first optical network traffic and identified by a second label,
      the second labeled traffic being of a lower priority than the first labeled traffic;
   route the first labeled traffic via the second path; and
   drop the second labeled traffic.

17. A system, comprising:
   one or more nodes to:
   determine a failure in a first path for routing first optical network traffic between a first set of networking devices,
      the first path including a first set of optical transport nodes;
   determine, based on determining the failure, a second path for routing the first optical network traffic between the first set of networking devices,
      the second path including a second set of optical transport nodes that route second optical network traffic between a second set of networking devices,
      the second set of optical transport nodes including at least one node that is not included in the first set of optical transport nodes;
   provision the second path by dropping, re-routing, or de-prioritizing the second optical network traffic via the second path based on determining the second path; and
   route the first optical network traffic via the second path based on provisioning the second path,
   where the one or more nodes are further to:
   determine that the failure in the first path has been resolved, such that an acknowledgment packet has been received from a networking device of the first set of networking devices;
   provision the first path for routing the first optical network traffic based on determining that the failure has been resolved;
   route the first optical network traffic via the first path, based on provisioning the first path;
   re-provision the second path by permitting routing of the second optical network traffic via the second path after routing the first optical network traffic via the first path; and
   route the second optical network traffic via the second path after re-provisioning the second path.

18. The system of claim 17, where the one or more nodes are further to:
   determine that an amount of traffic, identified with a particular label and received in a particular time period, satisfies a threshold; and
   where the one or more nodes, when determining the failure, are further to:
   determine the failure based on determining that the amount of traffic satisfies the threshold.

19. The system of claim 17, where the one or more nodes are further to:
   receive a notification indicating that the failure in the first path has occurred; and
      where the one or more nodes, when determining the failure, are further to:
      determine the failure based on receiving the notification.

20. The system of claim 17, where the one or more nodes are further to:
   receive an operations, administration, and management (OAM) message; and
   where the one or more nodes, when determining the failure, are further to:
   determine the failure based on receiving the OAM message.

21. The system of claim 17, where the one or more nodes, when provisioning the second path, are further to at least one of:
   drop the second optical network traffic;
   de-prioritize the second optical network traffic to a priority level below a priority level of the first optical network traffic; or
   re-route the second optical network traffic via a path other than the first path and the second path.

22. The system of claim 17, where the one or more nodes, when routing the first optical network traffic via the second path, are further to:
   determine first labeled traffic included in the first optical network traffic and identified by a first label;
   determine second labeled traffic included in the first optical network traffic and identified by a second label,
      the second labeled traffic being of a lower priority than the first labeled traffic;
   route the first labeled traffic via the second path; and
   drop the second labeled traffic.

23. A method, comprising:
   detecting, by a network node, a failure in a first path for routing first optical network traffic between a first set of networking devices,
      the first path including a first set of optical transport nodes and a first set of links between the first set of optical transport nodes;
   determining, by a network node and based on detecting the failure, a second path for routing the first optical network traffic between the first set of networking devices,
      the second path including a second set of optical transport nodes and a second set of links between the second set of optical transport nodes,
      the second set of optical transport nodes and the second set of links routing second optical network traffic between a second set of networking devices prior to detection of the failure;
   pre-empting, by a network node, routing of the second optical network traffic via the second path based on determining the second path;
   routing, by a network node, the first optical network traffic via the second path based on determining the second path;
   determining that an amount of traffic, identified with a particular label and received in a particular time period, satisfies a threshold; and
   where detecting the failure further comprises:
   detecting the failure based on determining that the amount of traffic satisfies the threshold.

24. The method of claim 23, further comprising:
   receiving an operations, administration, and management (OAM) message; and
   where detecting the failure further comprises:
   detecting the failure based on receiving the OAM message.

25. The method of claim 23, where pre-empting routing of the second optical network traffic further comprises at least one of:
   dropping the second optical network traffic;
   de-prioritizing the second optical network traffic to a priority level below a priority level of the first optical network traffic; or re-routing the second network traffic via a path other than the first path and the second path.

26. The method of claim 23, where routing the first optical network traffic via the second path further comprises:
   determining first labeled traffic included in the first optical network traffic and identified by a first label;
   determining second labeled traffic included in the first optical network traffic and identified by a second label,
   the second labeled traffic being of a lower priority than the first labeled traffic;
   routing the first labeled traffic via the second path; and
   dropping the second labeled traffic.

27. A method, comprising:
   detecting, by a network node, a failure in a first path for routing first optical network traffic between a first set of networking devices,
   the first path including a first set of optical transport nodes and a first set of links between the first set of optical transport nodes;
   determining, by a network node and based on detecting the failure, a second path for routing the first optical network traffic between the first set of networking devices,
   the second path including a second set of optical transport nodes and a second set of links between the second set of optical transport nodes,
   the second set of optical transport nodes and the second set of links routing second optical network traffic between a second set of networking devices prior to detection of the failure;
   pre-empting, by a network node, routing of the second optical network traffic via the second path based on determining the second path;
   routing, by a network node, the first optical network traffic via the second path based on determining the second path;
   detecting that the failure in the first path has been resolved, such that an acknowledgment packet has been received from a networking device of the first set of networking devices;
   provisioning the first path for routing the first optical network traffic based on detecting that the failure has been resolved;
   routing the first optical network traffic via the first path based on provisioning the first path;
   permitting routing of the second optical network traffic via the second path after routing the first optical network traffic via the first path; and
   routing the second optical network traffic via the second path based on permitting routing of the second optical network traffic.

28. The method of claim 27, further comprising:
   determining that an amount of traffic, identified with a particular label and received in a particular time period, satisfies a threshold; and
   where detecting the failure further comprises:
   detecting the failure based on determining that the amount of traffic satisfies the threshold.

29. The method of claim 27, further comprising:
   receiving an operations, administration, and management (OAM) message; and
   where detecting the failure further comprises:
   detecting the failure based on receiving the OAM message.

30. The method of claim 27, where pre-empting routing of the second optical network traffic further comprises at least one of:
   dropping the second optical network traffic;
   de-prioritizing the second optical network traffic to a priority level below a priority level of the first optical network traffic; or
   re-routing the second optical network traffic via a path other than the first path and the second path.

31. The method of claim 27, where routing the first optical network traffic via the second path further comprises:
   determining first labeled traffic included in the first optical network traffic and identified by a first label;
   determining second labeled traffic included in the first optical network traffic and identified by a second label,
   the second labeled traffic being of a lower priority than the first labeled traffic;
   routing the first labeled traffic via the second path; and
   dropping the second labeled traffic.

* * * * *